United States Patent
Takahashi et al.

(10) Patent No.: US 9,137,798 B2
(45) Date of Patent: Sep. 15, 2015

(54) WIRELESS TRANSMISSION DEVICE AND WIRELESS TRANSMISSION METHOD

(75) Inventors: Hiroki Takahashi, Osaka (JP); Yasuhiro Hamaguchi, Osaka (JP); Kazunari Yokomakura, Osaka (JP); Osamu Nakamura, Osaka (JP); Jungo Goto, Osaka (JP)

(73) Assignee: SHARP KABUSHIKI KAISHA, Osaka (JP)

(*) Notice: Subject to any disclaimer, the term of this patent is extended or adjusted under 35 U.S.C. 154(b) by 149 days.

(21) Appl. No.: 13/988,793

(22) PCT Filed: Nov. 24, 2011

(86) PCT No.: PCT/JP2011/077019
§ 371 (c)(1),
(2), (4) Date: May 22, 2013

(87) PCT Pub. No.: WO2012/070607
PCT Pub. Date: May 31, 2012

(65) Prior Publication Data
US 2013/0242930 A1    Sep. 19, 2013

(30) Foreign Application Priority Data
Nov. 25, 2010   (JP) .................................. 2010-262535

(51) Int. Cl.
H04W 4/00   (2009.01)
H04W 72/04   (2009.01)
H04W 28/04   (2009.01)
H04L 5/00   (2006.01)
H04L 25/06   (2006.01)
H04L 27/26   (2006.01)

(52) U.S. Cl.
CPC ....... *H04W 72/0453* (2013.01); *H04L 27/2623* (2013.01); *H04L 5/0023* (2013.01); *H04L 25/067* (2013.01); *H04L 27/2613* (2013.01); *H04W 28/04* (2013.01); *H04W 72/04* (2013.01)

(58) Field of Classification Search
CPC .............................. H04W 28/04; H04W 72/04
USPC ......................................................... 370/329
See application file for complete search history.

(56) References Cited

U.S. PATENT DOCUMENTS

| | | | |
|---|---|---|---|
| 2006/0160498 A1* | 7/2006 | Sudo | 455/103 |
| 2007/0248176 A1* | 10/2007 | Miyoshi | 375/260 |
| 2009/0042519 A1* | 2/2009 | Sudo | 455/101 |
| 2009/0180495 A1* | 7/2009 | Li et al. | 370/479 |
| 2010/0098177 A1 | 4/2010 | Hamaguchi et al. | |
| 2010/0104041 A1* | 4/2010 | Ibi et al. | 375/285 |
| 2010/0189092 A1* | 7/2010 | Seki | 370/344 |
| 2012/0069934 A1* | 3/2012 | Jiang et al. | 375/316 |

FOREIGN PATENT DOCUMENTS

| | | |
|---|---|---|
| JP | 2004-187257 A | 7/2004 |
| JP | 2008-219144 A | 9/2008 |
| WO | WO 2005/109684 A1 | 11/2005 |
| WO | WO 2006/006440 A1 | 1/2006 |
| WO | WO 2006/080317 A1 | 8/2006 |
| WO | WO 2008/081876 A1 | 7/2008 |

* cited by examiner

*Primary Examiner* — Christopher R Crompton
(74) *Attorney, Agent, or Firm* — Birch, Stewart, Kolasch & Birch, LLP

(57) ABSTRACT

A wireless transmission device is provisioned with a communication parameter setting unit configured to group time domain signals and setting different communication parameters for each group, a clipping unit configured to perform a clipping processing in the frequency domain on at least a portion of groups of the time domain signal, and a transmitting unit configured to transmit the time domain signal after the clipping processing.

7 Claims, 22 Drawing Sheets

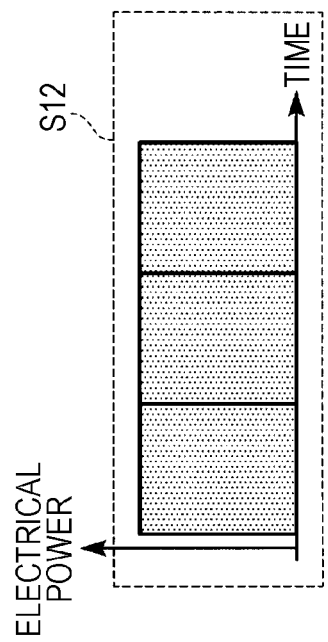
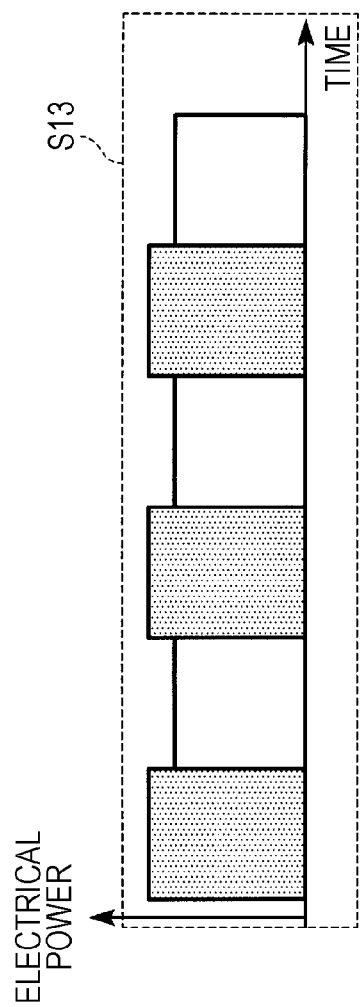

WIRELESS TRANSMISSION DEVICE AND WIRELESS TRANSMISSION METHOD

TECHNICAL FIELD

The present invention relates to a wireless transmission device and wireless transmission method.

The present application claims priority to Japanese Patent Application No. 2010-262535 filed on Nov. 25, 2010, the entire contents of which are incorporated by reference herein.

BACKGROUND ART

As the amount of data transmission continues to increase in recent years, the need for mobile communication systems with higher spectra efficiency also increases, and investigations into one-cell reuse cellular systems in which the same frequency band is used for all cells continue to advance. A one-cell reuse cellular system using the Orthogonal Frequency Division Multiple Access (OFDMA) method is adopted as a downlink transmission method regarding an Evolved Universal Terrestrial Radio Access (E-UTRA) system, which is becoming a standard through such organizations as the 3rd Generation Partnership Project (3GPP). Also, the non-contiguous/contiguous Discrete Fourier Transform Spread OFDM (DFT-S-OFDM) method, which is a discrete Fourier transform OFDM method that supports non-contiguous frequencies and contiguous frequencies, is being investigated as a valid candidate for an uplink transmission method.

The OFDMA method, which is the downlink transmission method, is a method using OFDM signals, which have superior resistance to multi-path fading, in which a user accesses in units of resource blocks (RB) divided by time or frequency. However, as the OFDMA method has high Peak-to-Average Power Ratio) PAPR properties, this is not applicable as an uplink transmission method, which has severe transmission power restrictions.

Conversely, the DFT-S-OFDM method can maintain excellent PAPR properties regarding multi-carrier methods such as OFDM by using signals spread by DFT in contiguous frequencies (RB), which ensures a wide coverage. Also, the DFT-S-OFDM method flexibly uses frequencies by using non-contiguous frequencies, and at the same time, can suppress degradation of PAPR properties to a certain extent. Also, it is being investigated if the switching between non-contiguous and contiguous frequencies in the non-contiguous/contiguous DFT-S-OFDM can be performed on the basis of the transmission power (refer to PTL 1 for example, hereafter referred to as a hybrid method). By using this hybrid method, cell coverage is maintained as a method using only contiguous DFT-S-OFDM, and at the same time, throughput of terminals within the cell can be improved, which also improves the throughput of the overall cell.

Conversely, a frequency clipping technology is also being investigated in which a portional frequency spectra regarding the DFT-S-OFDM method is not transmitted (hereafter, referred to as clipped DFT-S-OFDM) (for example, PTL 2).

FIG. 20 illustrates an example configuration of a transmitting device 1000 when using clipped DFT-S-OFDM for the uplink transmission. As in FIG. 20, an encoding unit 1001 performs error correction encoding on a transmission data D100. Next, a modulating unit 1002 performs modulation on the transmission data. A Discrete Fourier Transform (DFT) unit 1003 conducts a discrete Fourier transformation to convert the modulated symbols into frequency domain signals.

Here, a symbol number $N_{DFT0}$ (DFT size) to be converted one time is determined by a clipping amount and the bandwidth allocated to the transmitting device 1000 by a clipping control unit 1004.

Next, a clipping unit 1005 clips a portion of the output from the DFT unit 1003 based on the clipping information output from the clipping control unit 1004, and outputs the remaining signal to a mapping unit 1006. Here, clipping represents the amount of signal removed, and a clipping ratio $R_{clip}$ is defined as $R_{clip}=1-$[output sub-carrier number of the clipping unit 1005 (divided frequency point number)]/$N_{DFT0}$. However, when the clipping ratio is zero, the signal output from the clipping unit 1005 represents the normal DFT-S-OFDM signal. The components of the clipping signal may be previously determined positional components, or may be advertised by a control station such as a base station at every transmission in the same way as mapping information, which is described next. In the same way, the clipping ratio may be a predetermined ratio, or may be advertised from a control station such as a base station at every transmission.

The mapping unit 1006 allocates the signal output from the clipping unit 1005 into a sub-carrier (resource block) used in transmission. The mapping unit 1006 performs this allocation based on mapping information, and inserts a zero into a sub-carrier within this allocation that cannot be used in transmission. Further, known information between the transmitting device and the receiving device is used for this mapping information, and with regard to the obtaining method at the transmitting device mapping information, for example, mapping information determined by the receiving device that has been received as control information is used.

The methods to allocate the transmission signal into the sub-carrier used in transmission include a method to allocate the sub-carrier contiguously, and a method to allocate non-contiguously. When using a contiguous sub-carrier with a clipping ratio of zero, the generated signal is equivalent to a single carrier signal.

The transmission signal allocated into the sub-carrier to be used in transmission is input into an Inverse DFT (IDFT) unit 1007. The IDFT unit converts frequency domain signals into time domain signals by performing an inverse Fourier transformation on the input transmission signal. A reference signal generating unit 1008 generates a reference signal (also referred to as an RS signal or a pilot signal) used for estimating a propagation path at the receiving device. A reference signal multiplexor unit 1009 multiplexes the reference signal generated by the reference signal generating unit 1008 with the data signal output from the IDFT unit 1007, and outputs this to a transmission processing device 1010.

The transmission processing device 1010 inserts a Cyclic Prefix (CP), which is also referred to as a Guard Interval (GI), into the input transmission signal, conducts a Digital to Analog (D/A) conversion and upconverts to a carrier frequency band, and outputs the signal to the receiving device via a transmission antenna 1011.

FIG. 21 illustrates an example configuration of a clipped DFT-S-OFDM receiving device 2000. The receiving device 2000 receives the signal from the transmitting device by a receiving antenna 2001, which is then output to a receiving processing unit 2002. The receiving processing unit 2002 downconverts the received signal to a baseband frequency band, performs an Analog to Digital (A/D) conversion, and removes CP in this order, and outputs the signal that has been processed to a reference signal separating unit 2003.

The reference signal separating unit 2003 separates the data signal and the reference signal multiplexed in the time domain, outputs the data signal to a DFT unit 2006, and outputs the reference signal to a propagation path estimating unit 2004.

The propagation path estimating unit 2004 estimates the propagation path between the transmitting and receiving devices using the received reference signal, and outputs the obtained propagation path estimation value to an equivalent propagation path calculating unit 2005.

For the propagation path estimation value input into the equivalent propagation path calculating unit 2005, the propagation path estimation value of the band corresponding to the clipping position is output to an equalization unit 2010 and a propagation path multiplying unit 2016 as a zero. As a result, this band is not actually used during transmission, an equivalent processing is performed when the signal transmitted without clipping processing travels over a poor propagation path, and the receiving power for the receiving device is zero.

The DFT unit 2006 converts the input data signal into a frequency domain signal via DFT. A demapping unit 2007 performs a decoding processing on the received signal to extract the signal from the transmitting device 1000 (FIG. 20). However, the spectra clipped in the transmitting device 1000 is viewed as having also been transmitted, and so zero data corresponding to the clipped amount is inserted into the extracted frequency signal by a zero insertion unit 2008.

A replica signal which will be described later is input into a cancel unit 2009 from the propagation path multiplying unit 2016. The cancel unit 2009 performs a subtraction of the replica signal from the received signal. The equalization unit 2010 performs an equalization processing using the output signal from the cancel unit 2009 and the propagation path estimation value from the equivalent propagation path calculating unit 2005. Afterwards, an IDFT unit 2011 performs a conversion to a time domain signal via IDFT. A demodulating unit 2012 conducts a demodulation processing on the output from the IDFT unit 2011, and outputs this to a decoding unit 2013. The decoding unit 2013 conducts an error correction decoding, and then outputs a soft estimation value to a replica generating unit 2014, in correspondence to an optional number of iterations of a non-linear equalization processing. When the iterative processing is to be completed, the soft estimation value of the information bit is output to a determining unit 2017, and the determining unit 2017 outputs a reception data D200 by performing a hard determination.

When the iterative processing continues, a soft replica is generated at the replica generating unit 2014, and after a DFT unit 2015 converts this to a frequency domain signal, the propagation path multiplying unit 2016 multiplies the propagation path estimation value to which the clipping value has been factored, and outputs this to the cancel unit 2009.

Thus, the reliability of the information bit obtained at the determining unit 2017 can be increased by iterative a cancel operation at the cancel unit 2009 for an optional number of iterations.

CITATION LIST

Patent Literature

PTL 1: International Publication No. 2008/081876
PTL 2: Japanese Unexamined Patent Application Publication No. 2008-219144

SUMMARY OF INVENTION

Technical Problem

According to the DFT-S-OFDM method and the clipped DFT-S-OFDM method, which uses the same modulation method and encoding ratio, the frequency resources used by the later are less due to the process of clipping. For this reason, though this has the advantage in that other users can use this frequency resource, a portion of the information (spectrum) is clipped resulting in a problem such as increase in error ratio properties.

The present invention is the result of considering the previously described scenario, and so reduces the degradation in the error ratio properties of communication systems using the clipped DFT-S-OFDM method, and aims to provide a wireless transmission device and a wireless transmission method that reduces deterioration in error ratio properties and that has a minimum influence on a system.

Solution to Problem (1) A wireless transmission device according to a first form of the present invention is provisioned with a communication parameter setting unit configured to group time domain signals and setting different communication parameters for each group, a clipping unit configured to perform a clipping processing in the frequency domain on at least a portion of groups of the time domain signals, and a transmitting unit configured to transmit the time domain signal after the clipping processing.

(2) With the wireless transmission device according to the first form of the present invention, the communication parameter setting unit may perform a grouping of a systematic bit and a parity bit for error correction encoding.

(3) With the wireless transmission device according to the first form of the present invention, the communication parameter setting unit may perform a grouping by type of physical channel.

(4) With the wireless transmission device according to the first form of the present invention, the communication parameter setting unit may use electrical power as the communication parameter.

(5) With the wireless transmission device according to the first form of the present invention, the communication parameter setting unit may determine the electrical power allocated per group on the basis of a clipping ratio used by the clipping unit.

(6) With the wireless transmission device according to the first form of the present invention, the communication parameter setting unit may use a clipping ratio as the communication parameter.

(7) With the wireless transmission device according to the first form of the present invention, the communication parameter setting unit may use at least one of either a modulation method or encoding ratio as the communication parameter.

(8) With the wireless transmission device according to the first form of the present invention, the transmitting unit may transmit the time domain signal after the clipping processing from different antennas per group grouped by the communication parameter setting unit.

(9) With a wireless transmission method according to a second form of the preset invention, time domain signals is grouped, and a different communication parameter is set per group, a clipping processing is performed in the frequency domain on at least a portion of groups of the time domain signals, and the time domain signal after the clipping processing is transmitted.

Advantageous Effects of Invention

By using the wireless transmission device and the wireless transmission method according to the present invention, a wireless communication system may be constructed with a higher communication efficiency for communication systems using the clipped DFT-S-OFDM method.

BRIEF DESCRIPTION OF DRAWINGS

FIG. 9C is yet another diagram illustrating an overview of the third Embodiment of the present invention.

FIG. 9D is yet another diagram illustrating an overview of the third Embodiment of the present invention.

DESCRIPTION OF EMBODIMENTS

First Embodiment

According to the first Embodiment, when two groups of signals with different priority are multiplexed in the time domain, the signal with the lower priority is set with a higher clipping ratio, which is a communication parameter, over the signal with the higher priority. As a result, the performance of a highly efficient transmission is achieved.

For example, when using error correction encoding of which turbo encoding is an example, a systematic bit, which is the actual information data as the bit post encoding, and a parity bit used in error correction are time multiplexed and output. In this case, when the parity bit is missing, this only causes the encoding ratio to increase. However, when the systematic bit is missing, the decrease in properties of the actual information data that should be corrected, so the degradation in properties is large as compared to when the parity bit is missing. However, according to the clipped DFT-S-OFDM of the related art, clipping is performed after converting the two time multiplexed signals into frequencies. For this reason, the systematic bit is deleted without differentiation from the parity bit, which causes difficulty with restoration by error correction and a problem of a degradation of properties. Thus, the following illustrates an example seeking an improvement in properties by setting different clipping ratios for the systematic bit and the parity bit.

Figure 1A:
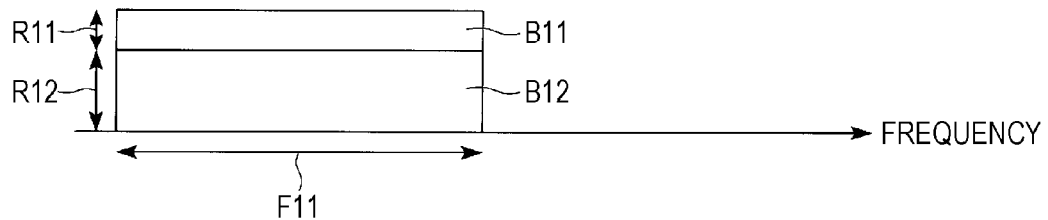
FIG. 1A is a diagram illustrating a frequency domain signal when using turbo encoding with an encoding ratio of one-third and no clipping.
Figure 1B:
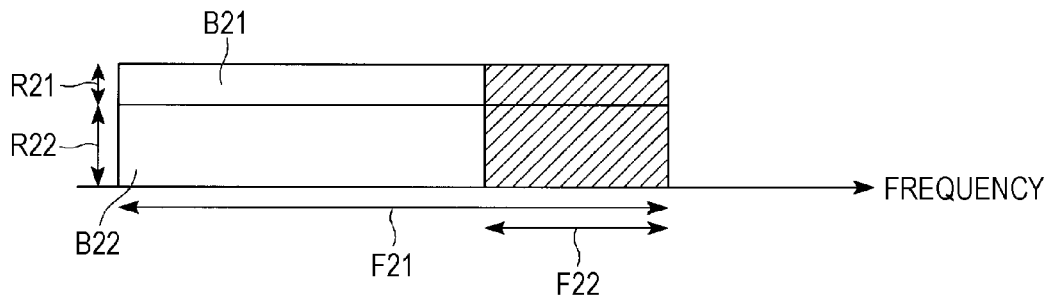
FIG. 1B is a diagram illustrating a frequency domain signal when enlarging a DFT zone by a magnitude of 1.5, and clipping one-third of this zone.
Figure 1C:
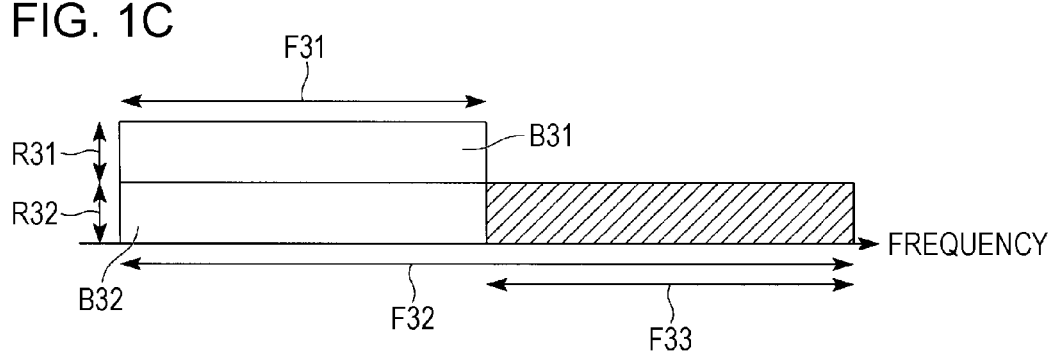
FIG. 1C is a diagram illustrating a frequency domain signal when independently preparing the DFT zone in a systematic bit and a parity bit, and clipping one-half of the parity bit.

FIG. 1A through 1C are diagrams illustrating an overview of a first Embodiment of the present invention. FIG. 1A is a diagram illustrating a frequency domain signal when using turbo encoding with an encoding ratio of one-third and no clipping. In FIG. 1A, a symbol B11 represents the systematic bits spread by DFT, a symbol B12 represents the parity bits spread by DFT, and a symbol F11 represents the DFT zone. As illustrated in FIG. 1A, the systematic bits B11 and a parity bits B12 spread by DFT are included in the DFT zone F11 at a ratio of 1:2 (R11:R12=1:2).

In contrast, in order to set the frequency usage efficiency to a magnitude of 1.5 using the clipped DFT-S-OFDM according to the related art, as illustrated in FIG. 1B, it is necessary to achieve an extension of the DFT zone by a magnitude of 1.5, and clipping a band equal to one-third of this zone. In FIG. 1B, a symbol B21 represents the systematic bits spread by DFT, a symbol B22 represents the parity bits spread by DFT, a symbol F21 represents the DFT zone, and a symbol F22 represents a zone in which a clipping of one-third will be performed. As illustrated in FIG. 1B, the systematic bits B21 and the parity bits B22 spread by DFT are included in the DFT zone F21 at a ratio of 1:2 (R21:R22=1:2).

When such a clipping as described above is performed, the systematic bits B21, which includes the information data to be transmitted, are also clipped by one-third. Particularly, higher encoding ratios cause difficulty to restore the information data, and error ratios worsen at the receiving device as compared to cases in which clipping is not applied.

In contrast, according to the first Embodiment and as illustrated in FIG. 1C, DFT zones are independently applied to the systematic bits and the parity bits, and the parity bits are clipped by one-half. As a result, there is no missing of the systematic bits due to clipping, and it is possible to achieve a frequency usage ratio of 1.5 times.

Further, in FIG. 1C, a symbol B31 represents the systematic bits spread by DFT, a symbol B32 represents the parity bits spread by DFT, a symbol F31 represents the DFT zone for the systematic bits, a symbol F32 represents the DFT zone for the parity bits, and a symbol F33 represents a zone in which a clipping of one-third will be performed. As illustrated in FIG. 1C, the systematic bits B31 spread by DFT is included in the DFT zone F31, and the parity bit B32 spread by DFT are included in the zone F32 at a ratio of 1.5:1.5 (R31:R32=1.5: 1.5).

In FIG. 1C, only the parity bits are clipped, that is to say, an embodiment is illustrated in which the clipping ratio for the systematic bits B31 is set to zero. However, an embodiment may be used in which clipping of the systematic bits B31 is performed at a clipping ratio (greater than zero) that is less than that of the parity bits B32.

Figure 2:
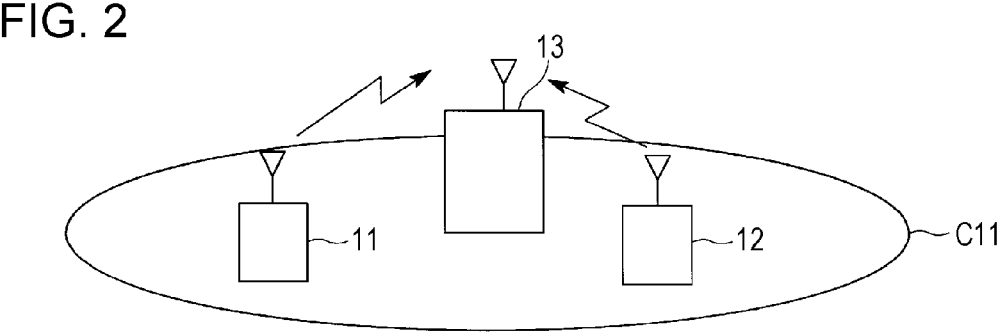
FIG. 2 is a diagram illustrating an example configuration of a wireless transmission system according to a first Embodiment.

FIG. 2 illustrates an example wireless communication system according to the first Embodiment. Similarly to a general wireless communication system, the wireless communication system according to the first Embodiment is provisioned with a first transmitting device 11, which is a mobile station device, a second transmitting device 12, which is a mobile station device, and a receiving device 13, which is a base station, in an area labeled as one cell C11. Here there are two transmitting devices, but the system is similar when using only one transmitting device, or 3 or more transmitting devices. The first and second transmitting devices 11 and 12, and the receiving device 13 are equipped with at least one antenna. The receiving device 13 receives signals transmitted from the first transmitting device 11 and the second transmitting device 12.

Hereafter, an uplink block configuration is illustrated in which the first and second transmitting devices 11 and 12 function as mobile station devices, and the receiving device 13 functions as the base station device. However, a downlink configuration in which the transmitting device is the base station device, and the receiving device is the mobile station device may be realized by performing similar processing.

Figure 3:
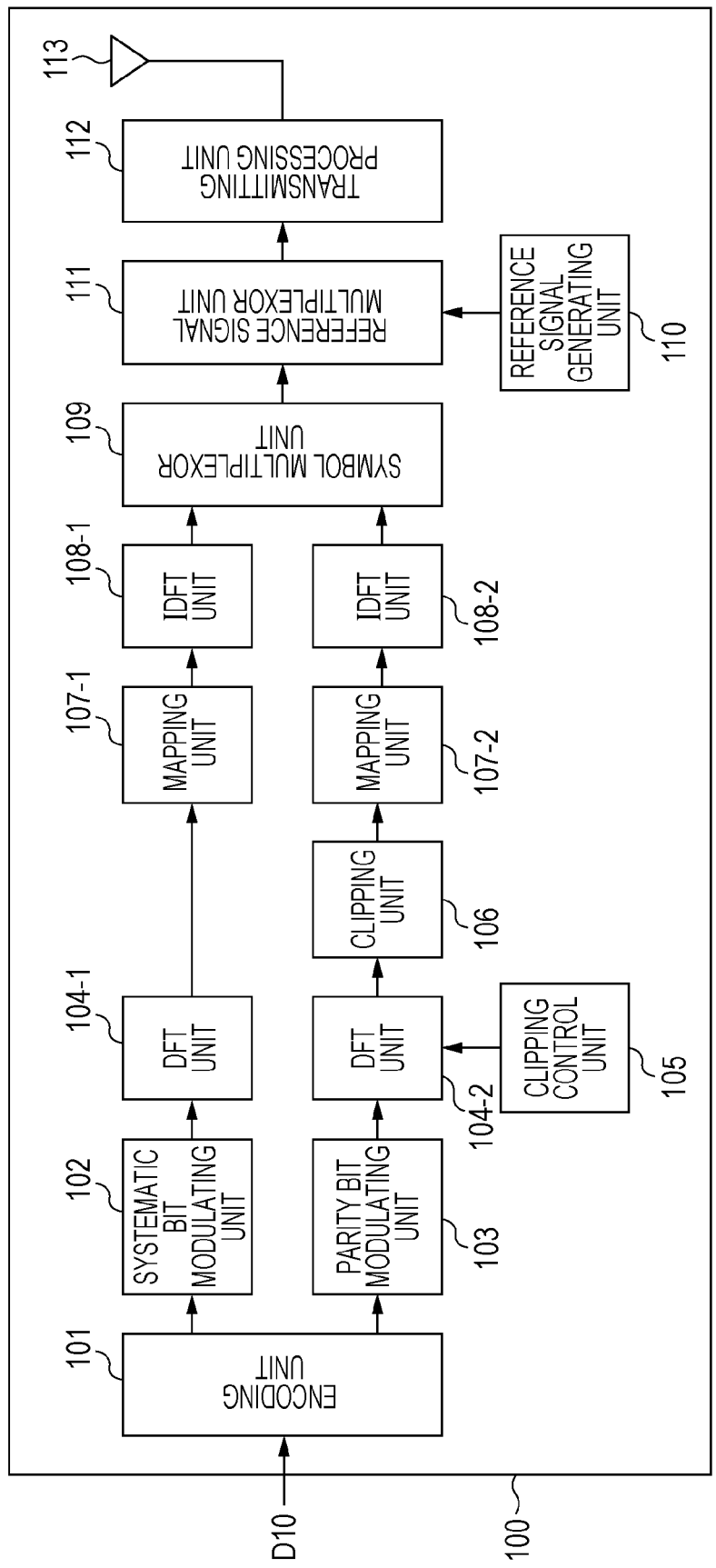
FIG. 3 is a block diagram illustrating an example configuration of a transmitting device according to the first Embodiment.

FIG. 3 is a block diagram illustrating an example configuration of a transmitting device 100 (the first transmitting device 11 or the second transmitting device 12) according to the first Embodiment. However, only the minimum number of block diagrams is illustrated to describe the first Embodiment, and the clipping ratio of the systematic bits is set to zero.

The transmitting device 100 is provisioned with an encoding unit 101, a systematic bit modulating unit 102, a parity bit modulating unit 103, DFT units 104-1 and 104-2, a clipping control unit 105, a clipping unit 106, mapping units 107-1 and 107-2, IDFT units 108-1 and 108-2, a symbol multiplexor unit 109, a reference signal generating unit 110, a reference signal multiplexor unit 111, a transmitting processing unit 112, and a transmission antenna 113.

Before the transmission of data is performed, the communication parameters such as the encoding ratio for the error correction encoding, the modulation method, the mapping information, and the clipping information used for the transmission, are known for the transmitting device 100. That notified as control information from the receiving device may be used as these communication parameters, or that determined within the transmitting device 100 may be used.

The encoding unit 101 conducts error correction encoding on a bit sequence of transmission data D10, based on the set encoding ratio. Here, the error correction encoding used is turbo encoding with an encoding ratio of one-third, and when encoding has been performed on an $N_{info}$ bits sequence, the encoding unit 101 outputs the $N_{info}$ systematic bits containing the transmission data D10 information, and $2N_{info}$ parity bits used for error correction. However, as the encoding ratio for the encoding unit 101 is set to one-third here, the parity bits twice as many as the system bits are output. However, systematic bits and parity bits of differing ratios may be output by deleting a portion of the parity bits (also referred to as puncturing). The systematic bits are input into the systematic bit modulating unit 102, the parity bits are input into the parity bit modulating unit 103, and modulation processing is performed using a specified modulation method such as Quarternary Phase Shift Keying (QPSK) or 16 Quadrature Amplitude Modulation (16QAM). A modulated symbol configured from the systematic bits (systematic symbol) and a modulated symbol configured from the parity bits (parity symbol) are input into the DFT units 104-1 and 104-2 respectively, and are converted from time domain signals into frequency domain signals by Discrete Fourier Transform (DFT). Here, DFT points (DFT size) of the systematic symbol $N_{DFT}^S$ is the same value as the allocated bandwidth. For the parity symbol, A DFT size $N_{DFT}^P$ at least as large as the allocated bandwidth, which equals $N_{DFT}^S/(1-R_{clip})$ ($R_{clip}$ is the clipping ratio not less than 0 but less than 1, which set by the clipping control unit 105), is used.

The clipping unit 106 deletes a portion of the spectra of the frequency domain parity symbol output by the DFT unit 104-2. The frequency point number of that to be deleted is $N_{DFT}^P \times R_{clip}$. The size of the parity symbol after deletion is represented as $N_{DFT}^S$. For this reason, the bandwidth of the portional spectra of the parity symbol input from the clipping unit 106 into the mapping unit 107-2 is equivalent to that of the systematic symbol input from the DFT unit 104-1 into the mapping unit 107-1. Thus, the same band $N_{DFT}^S$ is allocated for each the systematic symbol and the parity symbol at the mapping units 107-1 and 107-2, and then this is converted into time domain signals by Inverse DFT (IDFT) at the IDFT units 108-1 and 108-2. Further, the DFT size used by the IDFT units 108-1 and 108-2 is the value of the frame length $N_{DFT}$ ($\geq N_{DFT}^S$) used for the transmission. Further, the DFT used in the DFT units 104-1 and 104-2, and the IDFT units 108-1 and 108-2 may also use Fast Fourier Transform (FFT) and IFFT for the inverse transform.

The symbol multiplexor unit 109 multiplexes the systematic symbol input from the IDFT units 108-1 and the parity symbol input from the IDFT unit 108-2 in time domain. The multiplexing sequence may alternate between the systematic symbol and the parity symbol, or may multiplex a group of multiple systematic symbols and a group of parity symbols at fixed intervals.

The reference signal generating unit 110 generates the reference signal (RS, also referred to as the pilot signal) used for estimating the propagation path in the receiving device. The generated reference signal is multiplexed with the data signal output from the symbol multiplexor unit 109 at the reference signal multiplexor unit 111, and then this is output to the transmitting processing unit 112.

The transmitting processing unit 112 inserts a Cyclic Prefix (CP, also referred to as a Guard Interval (GI)) into the input transmission signal, conducts a Digital to Analog (D/A) conversion, upconverts to the carrier frequency band, and transmits this to the receiving device via the transmission antenna 113.

According to the transmitting device 100 illustrated in FIG. 3, a dual block is used so as to perform parallel processing of the systematic bit and the parity bit as from the systematic bit modulating unit 102 to the IDFT unit 108-1, and from the parity bit modulating unit 103 to the IDFT unit 108-2. However, processing may also be performed by a single block as long as the processing performed is similar to that of the transmitting device 100 illustrated in FIG. 3.

Figure 4:
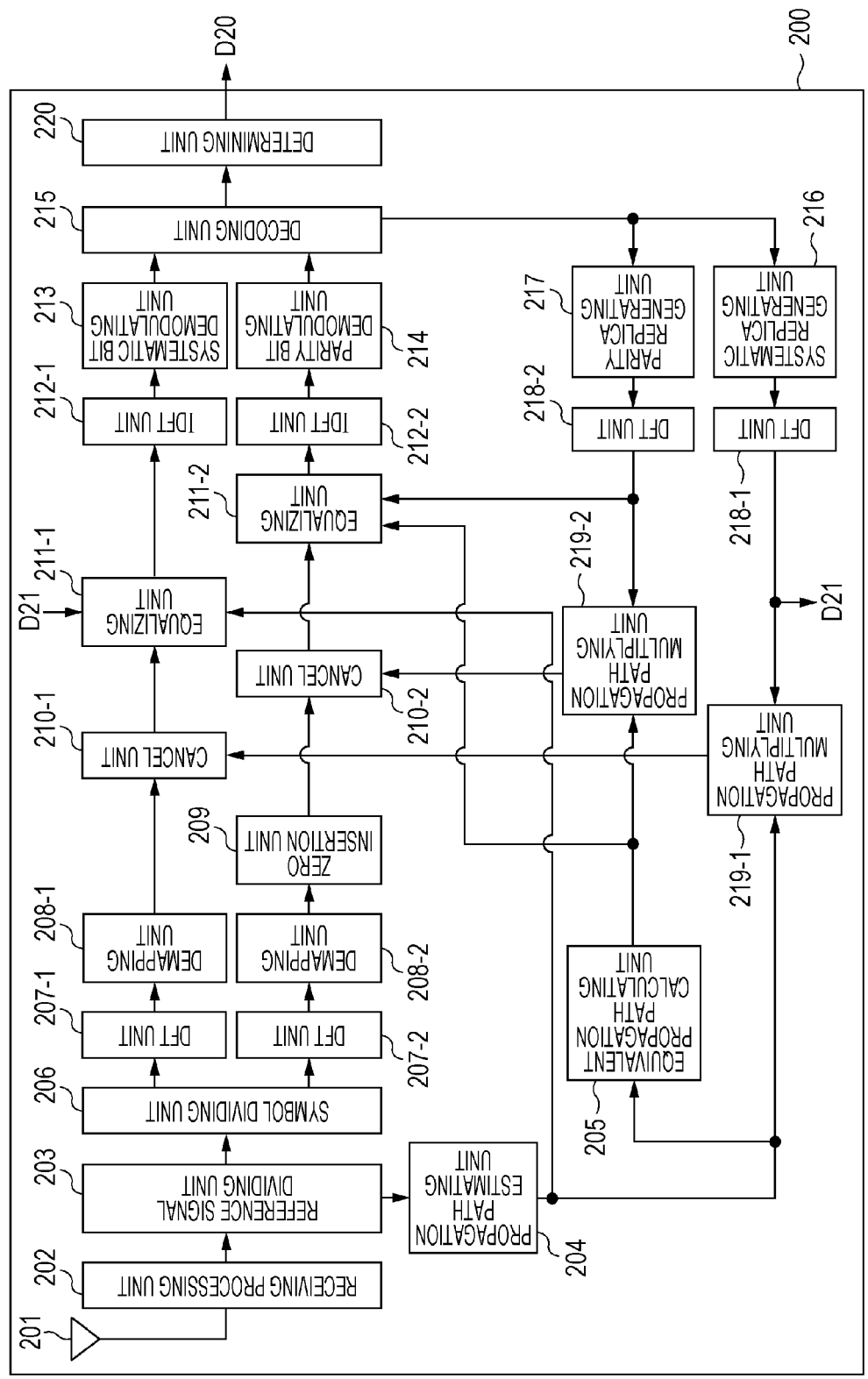
FIG. 4 is a block diagram illustrating an example configuration of a receiving device according to the first Embodiment.

FIG. 4 is a block diagram illustrating an example configuration of a receiving device 200 (receiving device 13) according to the first Embodiment of the present invention. The receiving device 200 is provisioned with a receiving antenna 201, a receiving processing unit 202, a reference signal separating unit 203, a propagation path estimating unit 204, an equivalent propagation path calculating unit 205, a symbol separating unit 206, DFT units 207-1 and 207-2, demapping units 208-1 and 208-2, a zero insertion unit 209, cancelling units 210-1 and 210-2, equalization units 211-1 and 211-2, IDFT units 212-1 and 212-2, a systematic bit demodulating unit 213, a parity bit demodulating unit 214, a decoding unit 215, a systematic replica generating unit 216, a parity replica generating unit 217, DFT units 218-1 and 218-2, propagation path multiplying units 219-1 and 219-2, and a determining unit 220.

The receiving device 200 receives via the receiving antenna 201 the signal where the transmitting signal has been multiplexed from one or more transmitting device 100 (FIG. 3). The receiving processing unit 202 downconverts the received signal from the carrier frequency band to a baseband frequency band, performs an Analog to Digital (A/D) conversion, removes the CP and then outputs the processed signal to the reference signal separating unit 203.

The reference signal separating unit 203 separates the reference signal from the data signal multiplexed in the time domain, outputs the data signal to the symbol separating unit 206, and outputs the reference signal to the propagation path estimating unit 204.

The reference signal input into the propagation path estimating unit 204 contains multiplexed signals from multiple transmitting devices 100, and so the reference signal is separated for each transmitting device 100. Further, the propagation path estimating unit 204 estimates the propagation path gain between the transmitting device 100 and the receiving device 200, and outputs the obtained propagation path estimation value to the equalization unit 211-1, the equivalent propagation path calculating unit 205, and the propagation path multiplying unit 219-1. However, processing after output of the propagation path estimation value is performed in parallel for each transmitting device 100, but a single processing corresponding to the transmitting device 100 in FIG. 3 is described according to the present example.

Taking the input propagation path estimation value, the equivalent propagation path calculating unit 205 sets the propagation path estimation value for the band corresponding to the position where the parity symbol has been clipped at the transmitting device 100 to zero, and outputs this to the equalization unit 211-2 and the propagation path multiplying unit 219-2. As a result, though this band is not actually used in the transmission, this process is equivalent to the process performed when a signal transmitted without clipping processing follows a poor propagation path and the receive power in the receiving device 200 is zero.

The symbol separating unit 206 separates the systematic symbol and the parity symbol that has been multiplexed in time domain, outputs the systematic symbol to the DFT unit 207-1, and outputs the parity symbol to the DFT unit 207-2.

The DFT units 207-1 and 207-2 convert the input systematic symbol and the parity symbol into frequency domain signals by DFT. The DFT size used by the DFT units 207-1 and 207-2 is the same size ($N_{DFT}$) used by the IDFT units 108-1 and 108-2 in the transmitting device 100 illustrated in FIG. 3. The demapping units 208-1 and 208-2 extracts the signal for the band used by each transmitting device 100 from the receiving signal, which are the signals from multiple transmitting devices 100 which are multiplexed in frequency domain. Further processing is performed on the multiplexed signal from each transmitting device 100, but a single processing corresponding to the transmitting device 100 in FIG. 3 will be described with the present example. The signal band extracted here has a bandwidth $N_{DFT}^S$ allocated by the mapping units 107-1 and 107-2 in the transmitting device 100 in FIG. 3. However, the parity symbol is viewed as also including the spectra clipped at the transmitting device 100. For this reason, at the zero insertion unit 209, a zero data equal to the amount of clipping $N_{DFT}^P \times R_{clip}$ is inserted into the frequency of the extracted signal where it is clipped by the transmitting device 100. Thus, the output signal has a size of $N_{DFT}^P$, and the data corresponding to the frequency clipped is set to zero.

The propagation path multiplying unit 219-1 multiplies the propagation path estimation value with the replica signal for the frequency domain output from the DFT unit 218-1, and inputs an obtained signal D21 into the cancelling unit 210-1, whereby the replica signal is subtracted from the receiving signal at the cancelling unit 210-1. The propagation path multiplying unit 219-2 multiplies the propagation path estimation value with the replica signal for the frequency domain output from the DFT unit 218-2, and inputs the obtained signal into the cancelling unit 210-2, whereby the replica signal is subtracted from the receiving signal at the cancelling unit 210-2. Here, as the replica signal is generated from output from the decoding unit 215 described later, the cancelling units 210-1 and 210-2 do not perform the subtraction processing for the initial iterative processing.

The equalization units 211-1 and 211-2 perform equalization processing using the residual components after cancelling the output from the cancelling units 210-1 and 210-2, and the propagation path estimation value output from the propagation path estimating unit 204 or the equivalent propagation path calculating unit 205. Afterwards, the replica signal input from the DFT units 218-1 and 218-2 is added to perform a restoration of the receiving signal. After this, the IDFT units 212-1 and 212-2 perform a conversion into time domain signals by IDFT. The DFT sizes for the IDFT units 212-1 and 212-2 are the same values as that of the DFT units 104-1 and 104-2 in the transmitting device 100 in FIG. 3, which is $N_{DFT}^S$ and $N_{DFT}^P$, respectively. Demodulating processing is conducted on the output from the IDFT unit 212-1 at the systematic bit demodulating unit 213. Also, a demodulating processing is performed on the output from the IDFT unit 212-2 at the parity bit demodulating unit 214. Also, each Log-Likelihood Ratio (LLR) is output to the decoding unit 215. The decoding unit 215 conducts error correction decoding using the input LLR for the systematic bits and the LLR for the parity bits. Afterwards, the decoding unit 215 outputs the LLR for the systematic bits after error correction to the systematic replica generating unit 216, depending on the optional number of non-linear equalization processing iterations. Also, the decoding unit 215 outputs the LLR for the parity bit after error correction to the parity replica generating unit 217. When the repeating processing is finished, the LLR of the information bit is output to the determining unit 220, and a receiving data D20 is output by performing a hard determination.

When the iterative processing continues, the systematic replica generating unit 216 generates a soft replica based on the input LLR, and the DFT unit 218-1 converts this into a frequency domain signal. The replica signal converted into a frequency signal is input to the equalization units 211-1 and used for the signal restoration, and also after being multiplied with propagation path estimation value at the propagation path multiplying unit 219-1, is used for the cancel at the cancel unit 210-1. Similarly, the parity replica generating unit 217 generates the soft replica based on the input LLR, and the DFT unit 218-2 converts this into a frequency domain signal. The replica signal converted into a frequency domain signal is input into the equalization unit 211-2 and the propagation path multiplying unit 219-2.

Hereafter, the reliability of the information bit input into the determining unit 220 may be increased by repeating the cancelling at the cancelling units 210-1 and 210-2 for an optional number of times.

The transmitting device 100 according to the first Embodiment (also referred to as the wireless transmission device) is provisioned with DFT units 104-1 and 104-2 for generating frequency domain signals (also referred to as a frequency domain signal generating unit), mapping units 107-1 and 107-2 for mapping the frequency domain signals in the sub-carrier, a clipping control unit 105 for grouping the time domain signals and setting different communication parameters for each group (also referred to as a communication parameter setting unit), a clipping unit 106 for clipping a portion of the frequency domain signal when mapping the frequency domain signal in the sub-carrier, and a transmitting processing unit 112 for transmitting the frequency signal arranged in the sub-carrier by the mapping units 107-1 and 107-2 (also referred to as a transmitting unit).

Further, the clipping control unit 105 may perform grouping by the systematic bit and the parity bit during error correction encoding.

Also, the clipping control unit 105 may perform grouping by the type of physical channel.

Also, the clipping control unit 105 may use electrical power as a communication parameter.

Also, the clipping control unit 105 may consider the bandwidth of the frequency domain signal to be clipped to determine the electrical power allocated to each group.

Also, the clipping control unit 105 may use the clipping ratio as a communication parameter.

Also, the clipping control unit 105 may use at least one of either the modulation method or the encoding ratio as a communication parameter.

Also, the transmitting processing unit 112 may transmit the frequency signal from a different antenna for each group grouped by the clipping control unit 105.

An example of the first Embodiment has been described in which the clipping processing is performed on only the spectra obtained by modulation and DFT of the parity bits. However, the clipping processing may also be performed on the spectra obtained by modulation and DFT of the systematic bits at a clipping ratio less than that of the parity bit spectra.

For example, if the clipping ratio for the parity bit spectra is set to 0.2, then the clipping ratio of the spectra for the systematic bit could be set to 0.05. Thus, such a clipping processing is included in the first Embodiment in which the clipping ratio for the parity bit is represented as $R_{clip}^P$ and the clipping ratio for the systematic bit is represented as $R_{clip}^S$, and the condition $R_{clip}^P > R_{clip}^S$ is satisfied.

As a general example illustrated according to the first Embodiment, the clipping is controlled so that the allocated band is the same for both the systematic symbol and the parity symbol. However, this is not limited thusly, and so the systematic symbol and the parity symbol may be set with different clipping ratios. That is to say, the systematic symbol and the parity symbol may have different frequency bandwidths after the clipping processing, and these symbols are then multiplexed in time domain.

The previous description described an example in which the systematic bit and the parity bit are two groups of signals with different priorities. However, the two groups of signals according to the first Embodiment are not limited thusly. For example, different clipping ratios may be set for each physical channel when time domain multiplexing signals using physical channels of at least two different types with different priorities.

According to the first Embodiment, when time domain multiplexing two groups of signals with different priorities in a communication system using the clipped DFT-S-OFDM method, a higher clipping ratio may be set for the signal with a lower priority as compared to the signal with high priority. As a result, the performance of a highly efficient transmission may be achieved.

Second Embodiment

According to the second Embodiment, an example will be described in which the systematic bit and the parity bit are grouped, and Multiple Input Multiple Output (MIMO) clipped DFT-S-OFDM is performed. This example of the second Embodiment is configured so that the transmitting device has two antennas and the receiving device has two antennas, but the configuration of the antennas for the transmitting and receiving devices is not limited to the present example.

Figure 5:
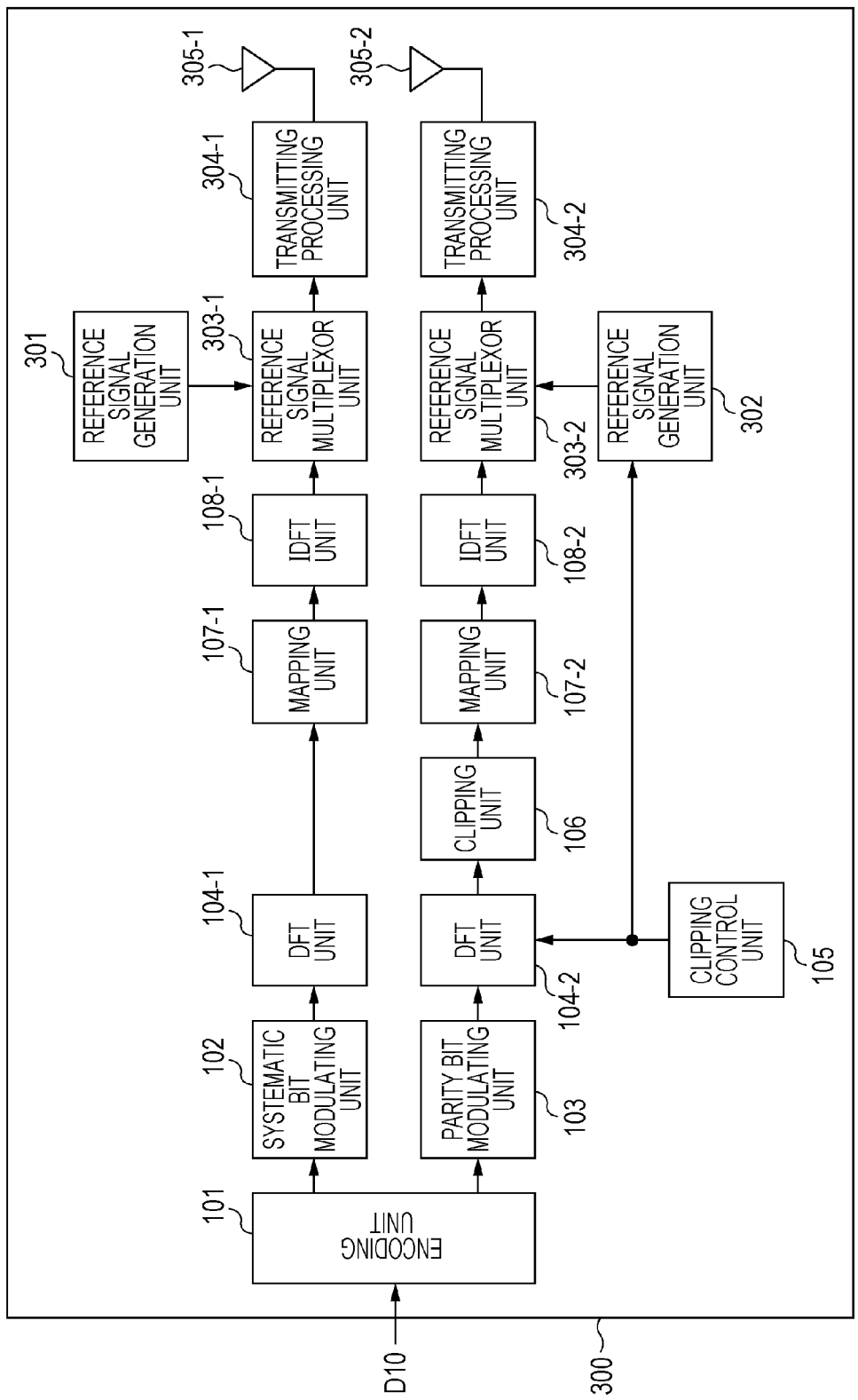
FIG. 5 is a block diagram illustrating an example configuration of a transmitting device according to a second Embodiment.

FIG. 5 is a block diagram illustrating an example configuration of a transmitting device 300 according to a second Embodiment. Similar to the first Embodiment, the transmitting device 300 groups the systematic bits and the parity bits output from the encoding unit 101, and outputs these to the systematic bit modulating unit 102 and parity bit modulating unit 103, respectively. The processing from the systematic bit modulating unit 102 until the IDFT unit 108-1, and the processing from the parity bit modulating unit 103 until the IDFT unit 108-2 are the same as that of the first Embodiment, and so their descriptions are omitted. The IDFT unit 108-1 outputs the systematic symbol to a reference signal multiplexor unit 303-1. Conversely, a reference signal generating unit 301 generates a reference signal to be multiplexed with data signals to which clipping is not applied, and so generates a reference signal that has the same bandwidth as that of the signal output from the DFT unit 104-1, and inputs this into the reference signal multiplexor unit 303-1. The reference signal multiplexor unit 303-1 multiplexes the time domain data signal and the reference signal input from the IDFT unit 108-1 and the reference signal generating unit 301, and outputs this to a transmitting processing unit 304-1.

A reference signal to be multiplexed in time domain with the parity symbol is similarly input into a reference signal multiplexor unit 303-2. Here, the reference signal input into the reference signal multiplexor unit 303-2 is generated by the reference signal generating unit 302 only at the signal bandwidth of the signal output from the clipping unit 106 that has not been clipping processed. The time domain data signal and reference signal which has been input are multiplexed at the reference signal multiplexor unit 303-2, and then input into a transmitting processing unit 304-2.

Figure 6A:
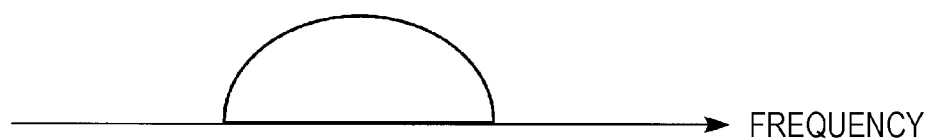
FIG. 6A is a diagram illustrating a signal transmitted from a first antenna of the transmitting device according to the second Embodiment.
Figure 6B:
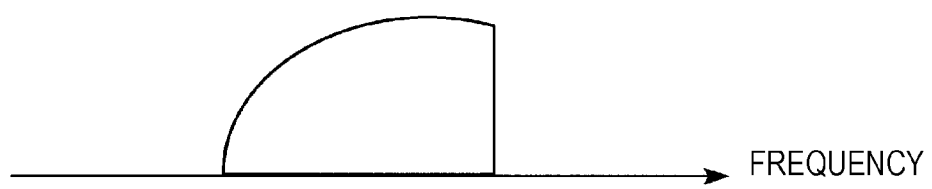
FIG. 6B is a diagram illustrating a signal transmitted from a second antenna of the transmitting device according to the second Embodiment.

The transmitting processing units 304-1 and 304-2 each conduct a CP insertion and a D/A conversion into the time domain transmitting signal, and then upconvert to a wireless frequency band signal. The signal output from the transmitting processing units 304-1 and 304-2 are each transmitted via a transmitting antenna 305-1 and a transmitting antenna 305-2. According to the previously described processing, as illustrated in FIGS. 6A and 6B, the transmitting signal grouped as the systematic bits without clipping conducted and the transmitting signal grouped as the parity bits with clipping conducted are spatial multiplexed. FIG. 6A illustrates a signal transmitted from the transmitting antenna 305-1 of the transmitting device 300. FIG. 6B illustrates a signal transmitted from the transmitting antenna 305-1 of the transmitting device 300. FIGS. 6A and 6B are diagrams illustrating an example of the transmitting-signal frequency spectra according to the second Embodiment, and the horizontal axis represents frequency.

Figure 7:
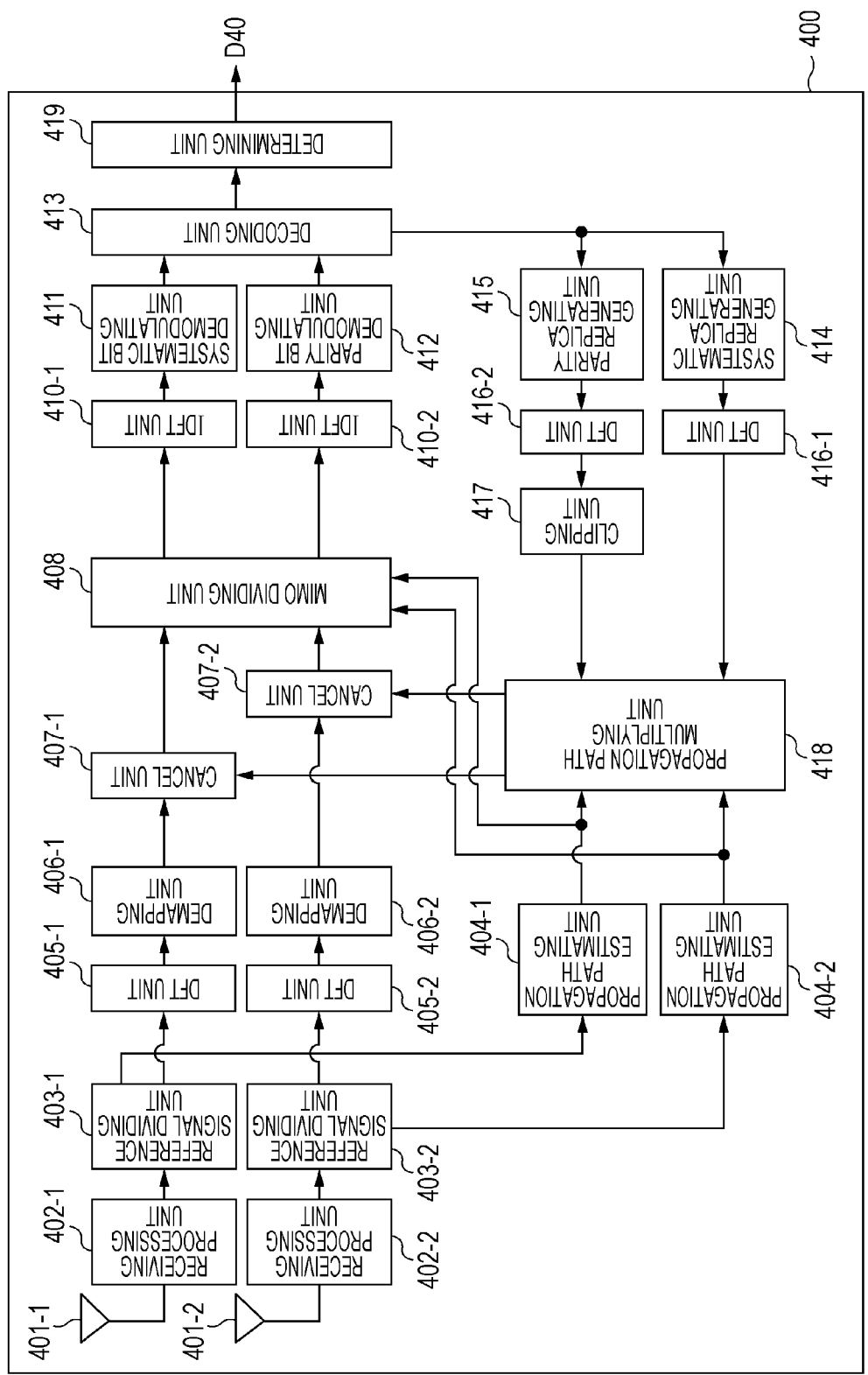
FIG. 7 is a block diagram illustrating an example configuration of a receiving device according to the second Embodiment.
Figure 8:
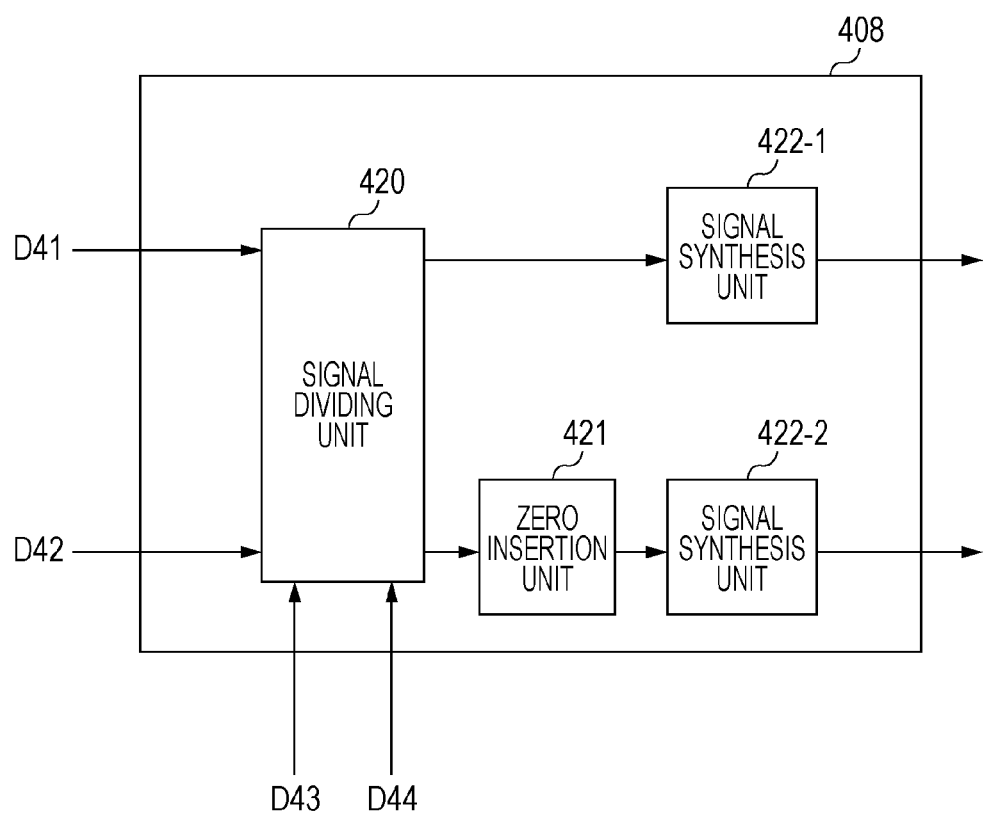
FIG. 8 is a block diagram illustrating an example internal configuration of a MIMO demultiplxing unit according to the second Embodiment.

A signal detection by the configuration of a receiving device 400 in FIG. 7 is performed on the signal that is the spatial multiplexing of the systematic bits and the parity bits. However, the present configuration is an example, and so may be included in the present invention as long as it is basically the same as the second Embodiment.

Signals are received at the receiving device 400 via a receiving antenna 401-1 and a receiving antenna 401-2. The signal received by the receiving antenna 401-1 is downconverted into a baseband frequency by a receiving signal processing unit 402-1, and after being converted into a digital signal by the performing of an A/D conversion, the CP is removed. A reference signal separating unit 403-1 separates the reference signal and the data signal that has been multiplexed in time domain, the data signal is output to a DFT unit 405-1, and the reference signal is output to a propagation path estimating unit 404-1. The propagation path estimating unit 404-1 estimates the frequency response from the reference signal, and outputs this to a propagation path multiplying unit 417 and a MIMO demultiplxing unit 408. Conversely, the DFT unit 405-1 converts the time domain data signal into a frequency domain signal, and outputs this to a demapping unit 406-1. The demapping unit 406-1 extracts the receiving signal according to the frequency the receiving device has allocated for the data using the frequency domain signal output by from the DFT unit 405-1. Also, a cancelling unit 407-1 performs a subtraction processing using the soft replica provided as feedback from a decoding unit 413. However, as there is no feedback from the decoding unit 413 during the initial subtraction processing, nothing is subtracted at this time. Also, the processing to generate the soft replica used for the subtraction processing at the cancelling unit 407-1 will be described later.

The signal to which the subtraction processing has been conducted by the cancelling unit 407-1 is input into the MIMO demultiplxing unit 408. The received signal from the other receiving antenna 401-2 is processed in the same way until the cancelling unit 407-2, and is then output to the MIMO demultiplxing unit 408. The MIMO demultiplxing unit 408 of the receiving device 400 includes a signal separating unit 420, a zero insertion unit 421, and a signal combining units 422-1 and 422-2. A signal D41 output by the cancelling unit 407-1, a signal D42 output by the cancelling unit 407-2, a signal D43 output by the propagation path estimating unit 404-1, and a signal D44 output by a propagation path estimating unit 404-2 are input into the signal separating unit 420. Spatial separation is performed using a spatial separation method such as Zero Forcing (ZF) or Minimum Mean Square Error (MMSE) regarding the frequency response and receiving signal of each antenna, with the signal separating unit 420. The frequency signal of the systematic symbol and the parity symbol obtained by the spatial separation is input into the signal combining units 422-1 and the zero insertion unit 421, respectively. The zero insertion unit 421 adds a zero equivalent to the bandwidth clipped by the transmitting device 300, and outputs this to the signal combining unit 422-2. A frequency domain soft replica output by DFT units 416-1 and 416-2 omitted in FIG. 7 is input into the signal combining units 422-1 and 422-2, and an addition of the input signals is performed. The frequency signal for the systematic symbol output from the DFT unit 416-1 is converted into a time domain systematic symbol by an IDFT unit 410-1, and the systematic bits is demodulated by a systematic bit demodulating unit 411. Afterwards, this is input into a decoding unit 413. Conversely, the frequency signal for the parity symbol output from the DFT unit 416-2 is converted into a time domain parity symbol by an IDFT unit 410-2. The parity symbol is demodulated into parity bits by the parity bit demodulating unit 412, and then input into the decoding unit 413. The decoding unit 413 conducts error correction decoding on the input systematic bits and parity bits, and outputs these to a systematic replica generating unit 414 and a parity replica generating unit 415, respectively.

The systematic bits processed by error correction decoding are converted into a time domain soft replica by the systematic replica generating unit 414 by modulation to the same modulation values conducted by the transmitting device 300. The soft replica output from the systematic replica generating unit 414 is converted from a time domain signal into a frequency domain signal by the DFT unit 416-1, and then output to a propagation path multiplying unit 418. Conversely, the parity bits output from the decoding unit 413 is converted into a time domain soft replica by the parity replica generating unit 415, and then converted into a frequency domain soft replica by the DFT unit 416-2. A clipping processing similar to that of the clipping unit 106 in the transmitting device 300 in FIG. 5 is performed on the frequency domain soft replica for the parity bits by a clipping unit 417, and then output to the propagation path multiplying unit 418. The soft replica cancelled from the receiving signal from each receiving antenna is generated by a processing at the propagation path multiplying unit 418 to multiply the frequency domain soft replica for the systematic bits and the parity bits with the frequency response of each receiving antenna, and is then input into the cancelling unit 407-1 and the cancelling unit 407-2. By iterating the processing from the previous cancelling processing to the decoding, the systematic bits which has been spatial multiplexed and the clipped parity bits in the receiving signal is separated, and the decoding processing is performed.

An example of the second Embodiment has been described in which clipping processing is performed on only the spectra of the parity bits obtained by modulation and DFT. However, a clipping processing may also be applied for the spectra of the systematic bits obtained by modulation and DFT at a clipping ratio lower than that for the parity bit spectra. For example, if the clipping ratio for the parity bit spectra is set to 0.2, then the clipping ratio for the systematic bit could be set to 0.05. Thus, such a clipping processing is included in the second Embodiment in which the clipping ratio for the parity bit is represented as $R_{clip}^{P}$ and the clipping ratio for the systematic bit is represented as $R_{clip}^{S}$, and the condition $R_{clip}^{P} > R_{clip}^{S}$ is satisfied.

By applying the second Embodiment, clipping processing is only conducted on the parity bits, or is conducted at a clipping ratio that used for the systematic bits, and so the Signal to Interference plus Noise Ratio (SINR) for the systematic bits after equalization processing is higher than that of the parity bits. Thus, there is little degradation in the results of the decoding unit 413 error correction caused by applying the MIMO clipped DFT-S-OFDM, which enables the application of an efficient clipping technology.

Third Embodiment

Figure 9A:
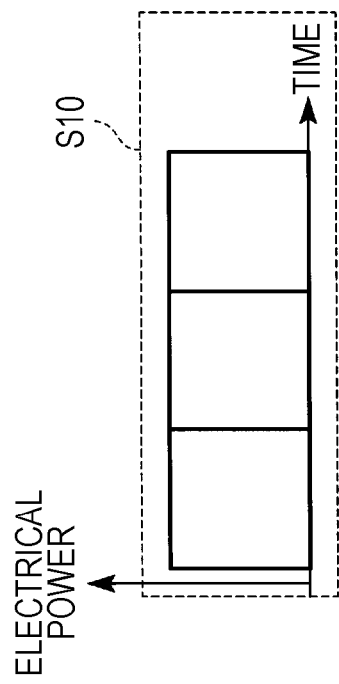
FIG. 9A is a diagram illustrating an overview of a third Embodiment of the present invention.
Figure 9B:
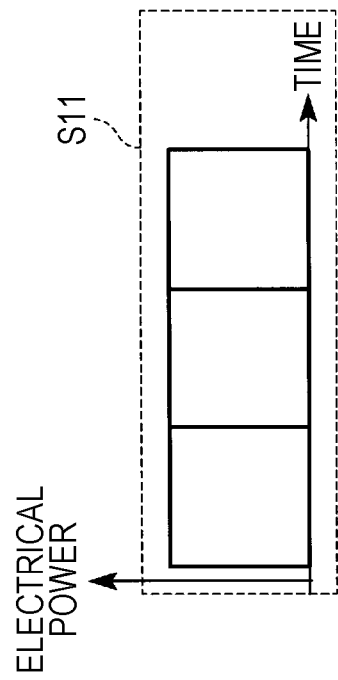
FIG. 9B is another diagram illustrating an overview of the third Embodiment of the present invention.

FIG. 9A through 9D are diagrams illustrating an overview of a third Embodiment of the present invention. FIG. 9A is a diagram illustrating a modulation symbol (systematic symbol) S10 configured only by the systematic bits. FIG. 9B is a diagram illustrating a modulation symbol (parity symbol) S11 configured only by the parity bits converted on a time axis after the clipping processing has been conducted in the existing frequency domain. With clipping, a portion of the spectra is not transmitted by the transmitting device, and so compared to a case in which the spectra is not deleted, there can be a surplus transmitting power (energy). Therefore, the transmitting power consumed by clipping may be used as a communication parameter by allocating another symbol. This usable transmitting power is redistributed in the transmitting power of the systematic symbol. FIG. 9C is a diagram illustrating a systematic symbol S12 to which the power redistribution has been performed. In FIG. 9C, the transmitting power decreased by clipping is redistributed to the systematic symbol uniformly. After this, the processing illustrated in FIG. 9D is performed. FIG. 9D is a diagram illustrating a transmitting symbol S13 to which the systematic symbol and the parity symbol have been multiplexed in time domain. Further, in FIG. 9D, the systematic symbol and the parity symbol are alternately time multiplexed, but this is not limited thusly. For example, the systematic symbol may be multiplexed continuously, and afterwards the parity symbol may be multiplexed. Also, there may be a different number of systematic symbols and parity symbols, and this is also within the scope of the present invention.

In FIG. 9A through 9D, the transmitting power decreased by clipping is redistributed only to the systematic symbol. However, a method may also be used in which two-thirds of the transmitting power to be redistributed is allocated to the systematic symbol, and one-third of the transmitting power to be redistributed is allocated to the parity symbol. As a result, the accuracy of the systematic bits, which is one of the most critical elements for error correction, may be improved, and at the same time, the frequency usage efficiency may be improved by clipping.

Figure 10:
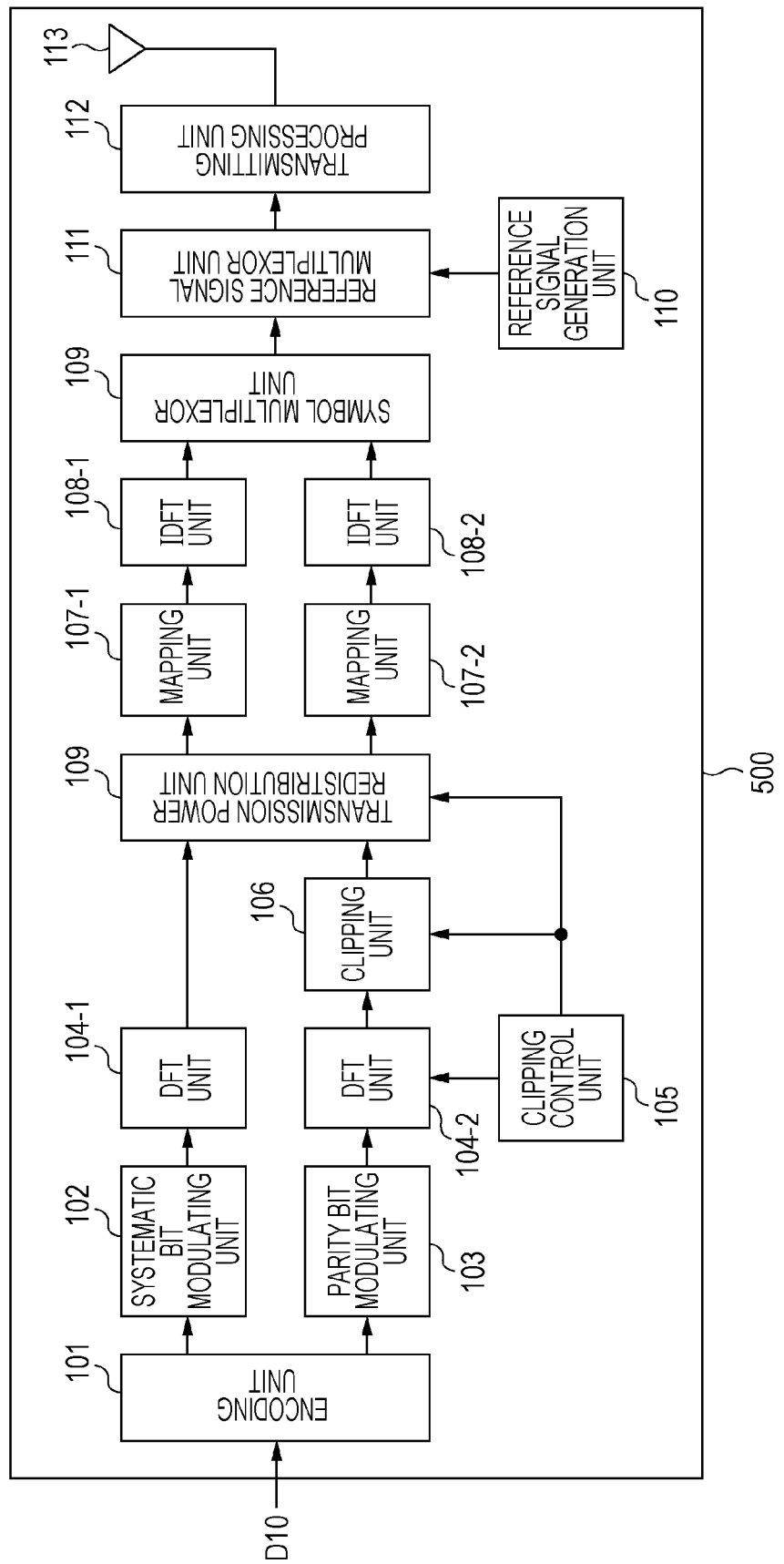
FIG. 10 is a schematic block diagram illustrating an example configuration of a transmitting device according to the third Embodiment.

Next, the configuration of the transmitting device according to the third Embodiment will be described specifically. FIG. 10 is a schematic block diagram illustrating an example configuration of a transmitting device 500 according to the third Embodiment. The transmitting device 500 in FIG. 10 has the same basic configuration as that of the transmitting device 100 (FIG. 3) of the first Embodiment, but the difference is the provisioning of a transmitting power redistribution unit 501. The transmitting power redistribution unit 501 appropriately redistributes the transmitting power equal to the amount clipped from the parity symbol to the systematic symbol and the parity symbol, based on the clipping amount (may also be the clipping ratio) input from a clipping control unit 105a.

Figure 11:
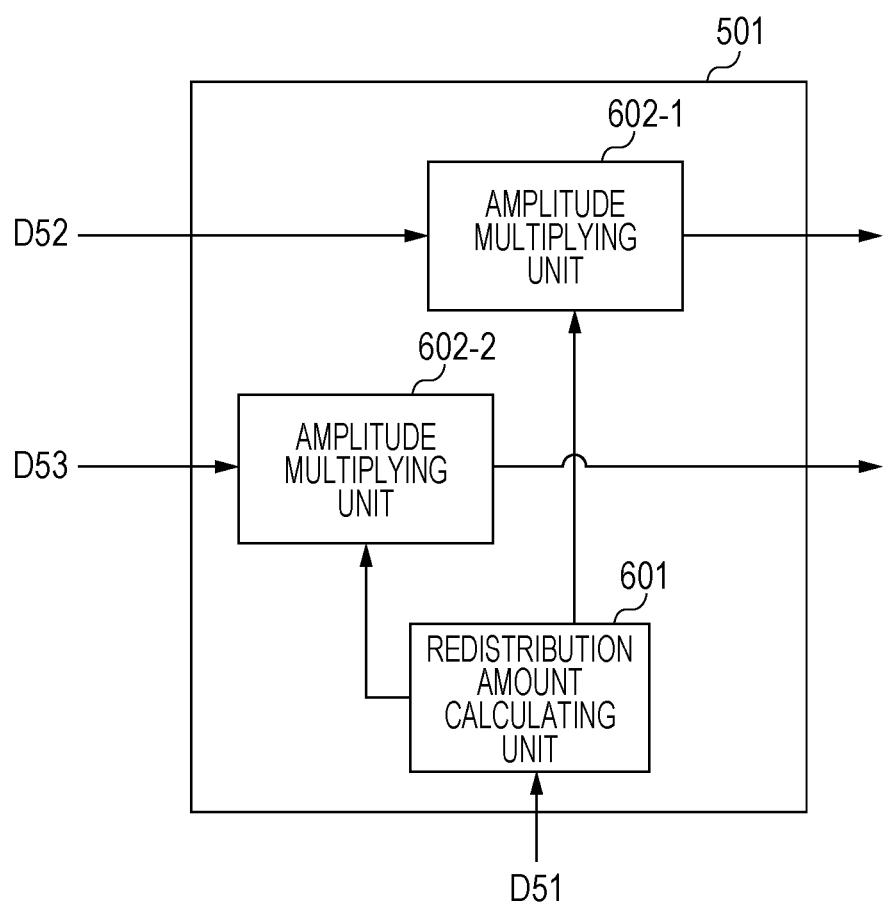
FIG. 11 is a block diagram illustrating an example internal configuration of a transmission power redistribution unit according to the third Embodiment.

FIG. 11 illustrates a configuration example of the transmission power redistribution unit 501 in the transmitting device 500 (FIG. 10). The transmitting power redistribution unit 501 includes a redistribution amount calculating unit 601, and an amplitude multiplying units 602-1 and 602-2. The redistribution amount calculating unit 601 calculates the electrical power amount to redistribute to the systematic symbol and the parity symbol, based on an input clipping amount D51. If the DFT point number for the parity symbol is set to $N_{DFT}^{P}$, and the clipping ratio is set to $R_{clip}$, then a transmitting power $P_{sys}$ and $P_{par}$ to be redistributed to the systematic symbol and the parity symbol may each be determined by the following expression (1) and expression (2).

$$P_{sys} = \alpha \times R_{clip} \times E_S N_{DFT}^{P} \quad (1)$$

$$P_{par} = (1-\alpha) \times R_{clip} \times E_S N_{DFT}^{P} \quad (2)$$

Here, the $\alpha$ represents a parameter that may be optionally set. When $\alpha$ equals one, $P_{par}$ equals zero, which means that redistribution will only be applied to the systematic symbol. Also, the $E_S$ represents the electrical power (energy) allocated to one modulated symbol. The transmitting power calculated in this way is allocated by the amplitude multiplying units 602-1 and 602-2. Further, a systematic symbol D52 is input into the amplitude multiplying unit 602-1, and a parity symbol D53 is input into the amplitude multiplying unit 602-2. If the DFT point number of the systematic symbol is $N_{DFT}^{S}$, then the amplitude gain multiplied by the amplitude multiplying units 602-1 and 602-2 is calculated with the following expression (3) and expression (4).

$$G_{sys} = \sqrt{1 + \frac{\alpha \times R_{clip} \times N_{DFT}^{P}}{N_{DFT}^{S}}} \quad (3)$$

$$G_{par} = \sqrt{1 + \frac{(1-\alpha)R_{clip}}{1 - R_{clip}}} \quad (4)$$

However, $G_{sys}$ and $G_{par}$ represent positive real numbers to be multiplied with the systematic symbol and the parity symbol. The amplitude gain calculated in this way is multiplied with each modulated symbol, and then is input into the mapping units 107-1 and 107-2.

By using such a transmitting device 500 according to the third Embodiment, accuracy of the systematic bits, which is one of the most critical elements for error correction, may be improved, and at the same time, the frequency usage efficiency may be improved by clipping.

Further, the receiving device according to the third Embodiment does not have any differences with that of the receiving device 200 (FIG. 4) according to the first Embodiment, and performs the demodulation viewing the redistributed electrical power as an equivalent propagation path property.

Fourth Embodiment

Figure 12:
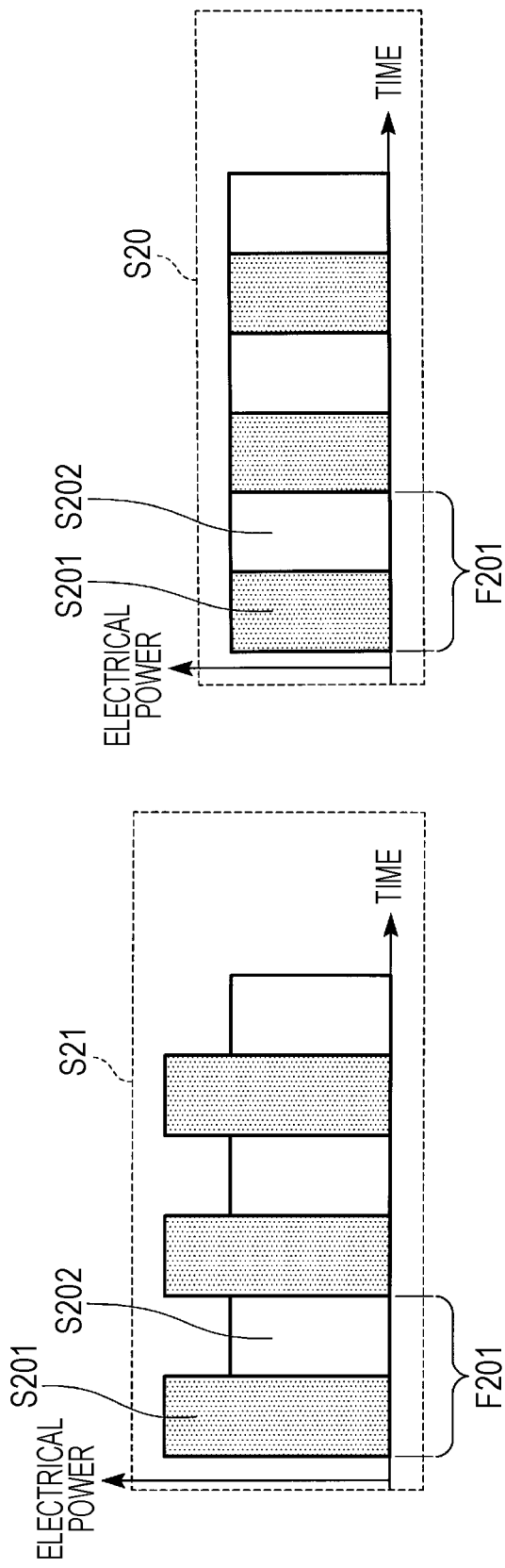
FIG. 12A is a diagram illustrating an overview of a fourth Embodiment of the present invention.
FIG. 12B is another diagram illustrating an overview of the fourth Embodiment of the present invention.

FIGS. 12A and 12B are diagrams illustrating an overview of a fourth Embodiment of the present invention. According to the third Embodiment, the systematic symbol and the parity symbol are multiplexed in time domain by DFT block.

However, according to the fourth Embodiment, the systematic symbol and parity symbol are multiplexed in time domain within the DFT block. In this case, the clipping is conducted on the entire transmission signal, which is different from the first and second Embodiments. This will be described using an example configuration of a transmitting device. As illustrated by S20 in FIG. 12A, a systematic symbol S201 and a parity symbol S202 are time multiplexed within a DFT zone F201, and time multiplexed further per DFT block. Also, considering that clipping is conducted, the transmitting power decreased by the clipping may be used as a communication parameter. This is represented as S21 in which only the modulating symbol for the systematic symbol is redistributed (FIG. 12B). By redistributing the transmission power decreased by clipping to the systematic symbol S201 in this way, accuracy of the systematic bits, which is one of the most critical elements for error correction, may be improved, and at the same time, the frequency usage efficiency may be improved by clipping. Further, there is no particular limit on the kind of time sequence for time multiplexing the systematic symbol and the parity symbol.

Figure 13:
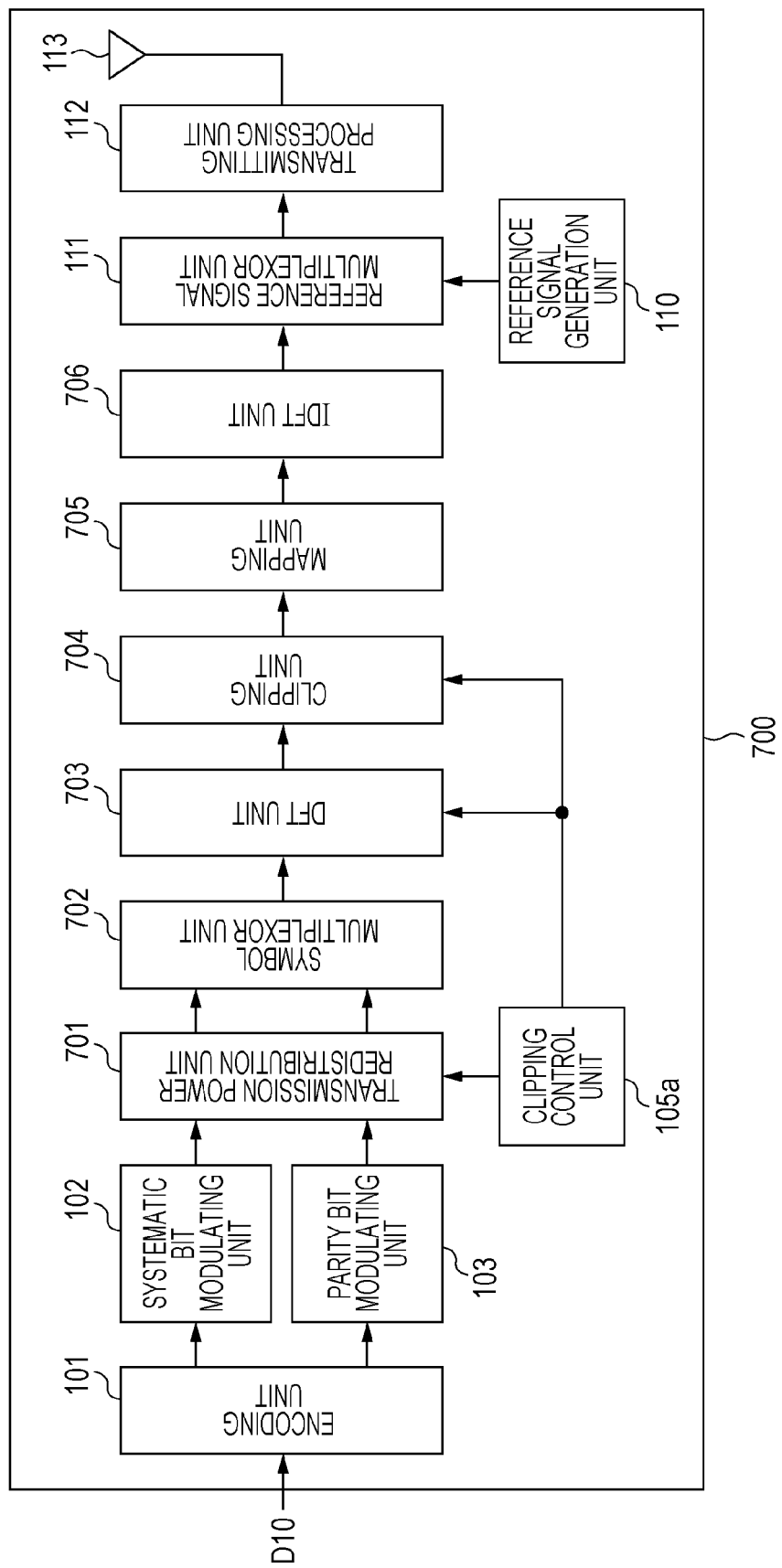
FIG. 13 is a block diagram illustrating an example configuration of a transmitting device according to the fourth Embodiment.

Next, the specific configuration of the transmitting device according to the fourth Embodiment will be described. FIG. 13 is a block diagram illustrating an example configuration of a transmitting device 700 according to the fourth Embodiment. The transmitting device 700 in FIG. 13 has the same basic configuration as that of the transmitting device 500 (FIG. 10) according to the third Embodiment. However, as the transmitting device 700 multiplexes within the DFT zone, the position of a transmitting power redistribution unit 701 and a symbol multiplexor unit 702 are different. Further, according to the third Embodiment, the time multiplexing unit is the DFT block for the symbol multiplexor unit 109. However, according to the fourth Embodiment, the time multiplexing unit is each modulated symbol. Therefore, the symbol multiplexor unit 702 is provisioned upstream from a DFT unit 703. Also, as all the DFT point numbers are the same, the DFT unit 703, a clipping unit 704, a mapping unit 705, and an IDFT unit 706 are grouped as a single system, but their functionality is the same as the embodiments previously described.

Error correction encoding is performed on the transmission data by the encoding unit 101. The systematic bits and the parity bits which has been processed by error correction encoding is input into the transmitting power redistribution unit 701. Afterwards, the systematic bits and parity bits are multiplexed in time domain within the DFT zone as illustrated in FIGS. 12A and 12B by the symbol multiplexor unit 702, converted to frequency domain signals by the DFT unit 703, and clipping is then conducted by the 704. Afterwards, processing similar to that of the first through third Embodiments is performed before being transmitted.

Figure 14:
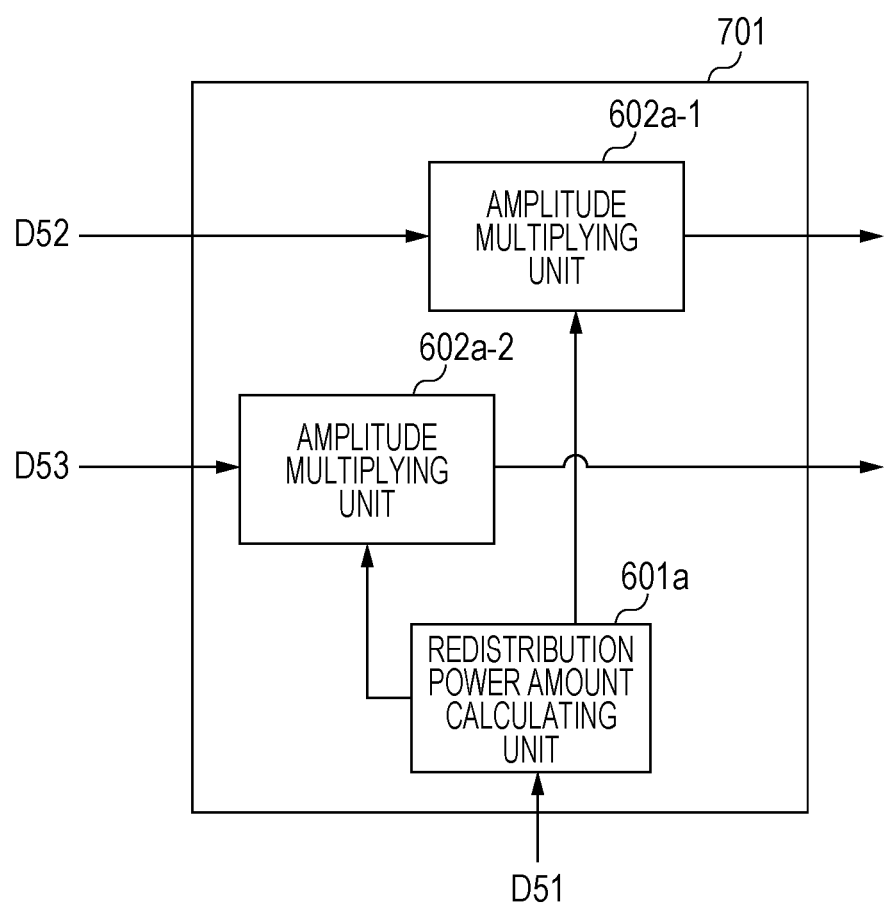
FIG. 14 is a block diagram illustrating an example internal configuration of a transmission power redistribution unit according to the fourth Embodiment.

An example configuration of the transmitting power redistribution unit 701 is illustrated in FIG. 14. The configuration of the transmitting power redistribution unit 701 illustrated in FIG. 14 is the same configuration of the transmitting power redistribution unit 501 in FIG. 11. However, according to the third Embodiment, control is performed per DFT block, and according to the fourth Embodiment, control is performed per modulated symbol.

A redistribution amount calculating unit 601a in the transmitting power redistribution unit 701 calculates the amount of electrical power to be redistributed to the systematic symbol and the parity symbol. If the DFT point number is set to $N_{DFT}$ and the clipping ratio is set to $R_{clip}$, then the transmitting power $P_{sys}$ and $P_p$, to be redistributed to the systematic symbol and the parity symbol may each be determined by the following expression (5) and expression (6).

$$P_{sys} = \alpha \times R_{clip} \times E_S N_{DFT} \quad (5)$$

$$P_{par} = (1-\alpha) \times R_{clip} \times E_S N_{DFT} \quad (6)$$

Here, α represents a parameter that may be optionally set. When α equals one, $P_{par}$ equals zero, which means that redistribution will only be applied to the systematic symbol. Also, the $E_S$ represents the electrical power (energy) allocated to one modulated symbol. The transmitting power calculated in this way is allocated by the amplitude multiplying units 602a-1 and 602a-2. If the DFT point number is set to $N_{DFT}$, then the amplitude gain multiplied by the amplitude multiplying units 602a-1 and 602a-2 is calculated with the following expression (7) and expression (8).

$$G_{sys} = \sqrt{1 + \alpha \times R_{clip}} \quad (7)$$

$$G_{par} = \sqrt{1 + \frac{(1-\alpha)R_{clip}}{1 - R_{clip}}} \quad (8)$$

However, $G_{sys}$ and $G_{par}$ represent positive real numbers to be multiplied with the systematic symbol and the parity symbol. The amplitude gain calculated in this way is multiplied with each modulated symbol, and then is input into the mapping unit 705.

By using the transmitting device 700 according to the fourth Embodiment, accuracy of the systematic bits, which is one of the most critical elements for error correction, may be improved, and at the same time, the frequency usage efficiency may be improved by clipping.

Figure 19:
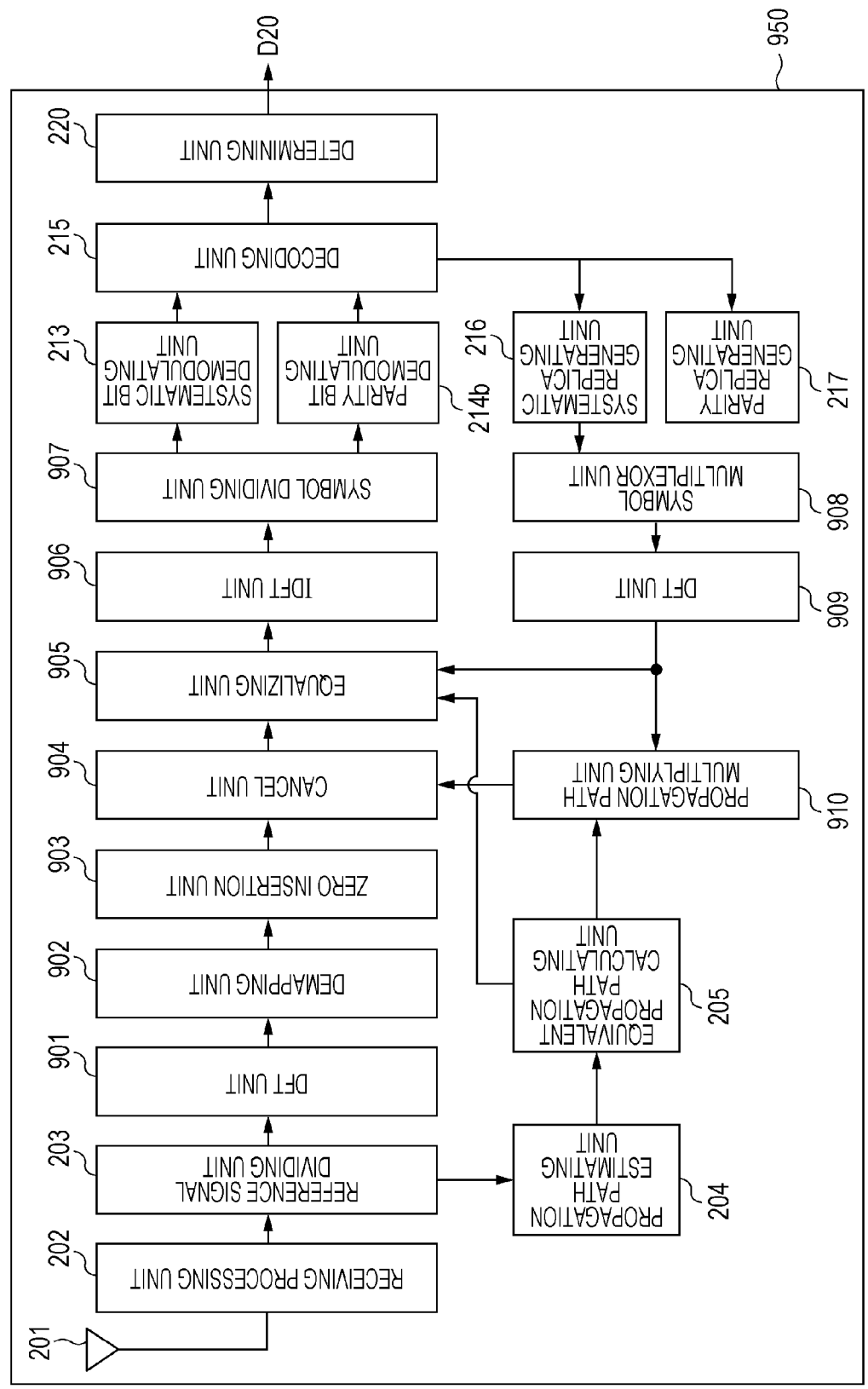
FIG. 19 is a block diagram illustrating an example configuration of a receiving device according to the fifth Embodiment.
Figure 20:
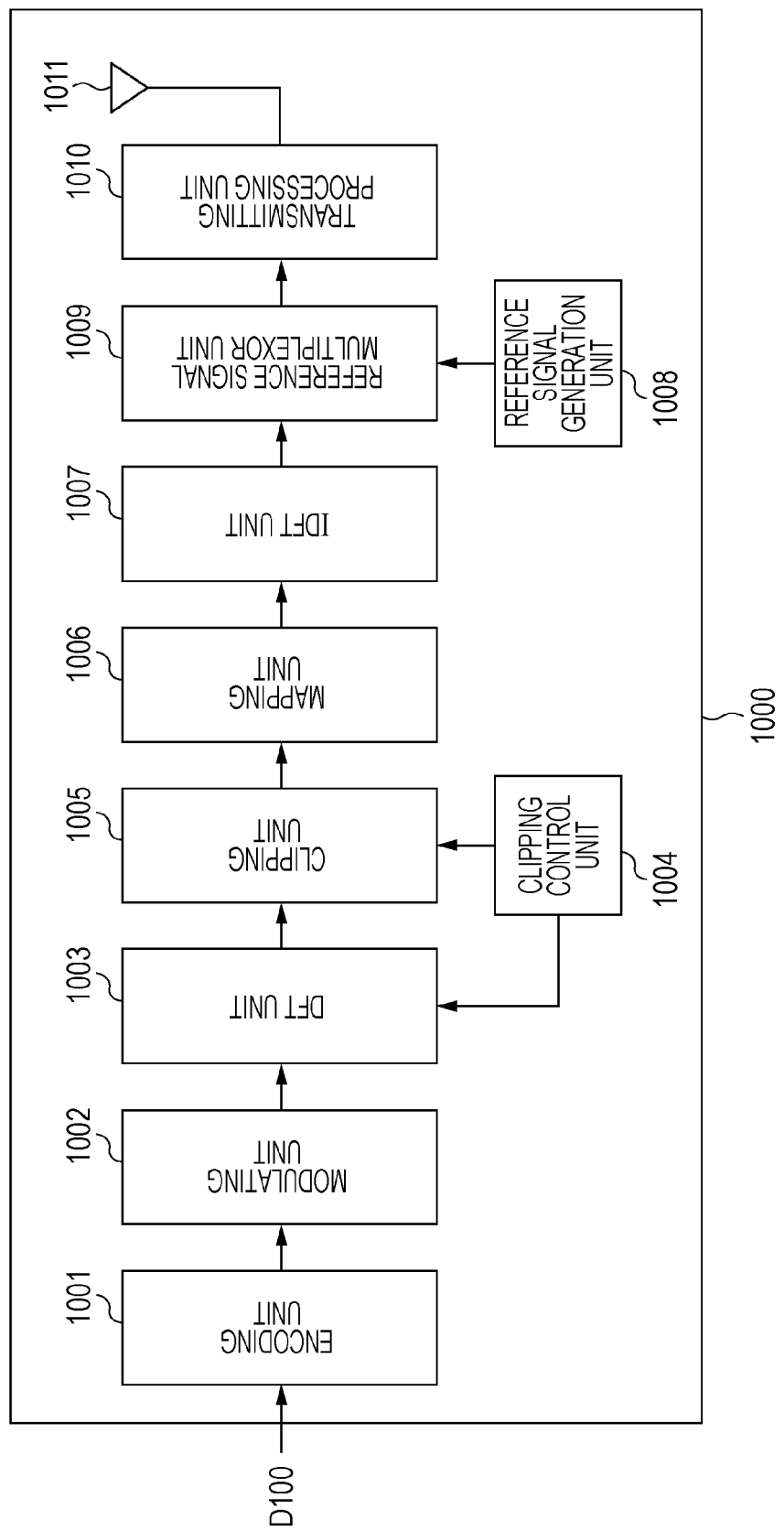
FIG. 20 is a block diagram illustrating an example configuration of a clipped DFT-S-OFDM transmitting device according to the related art.
Figure 21:
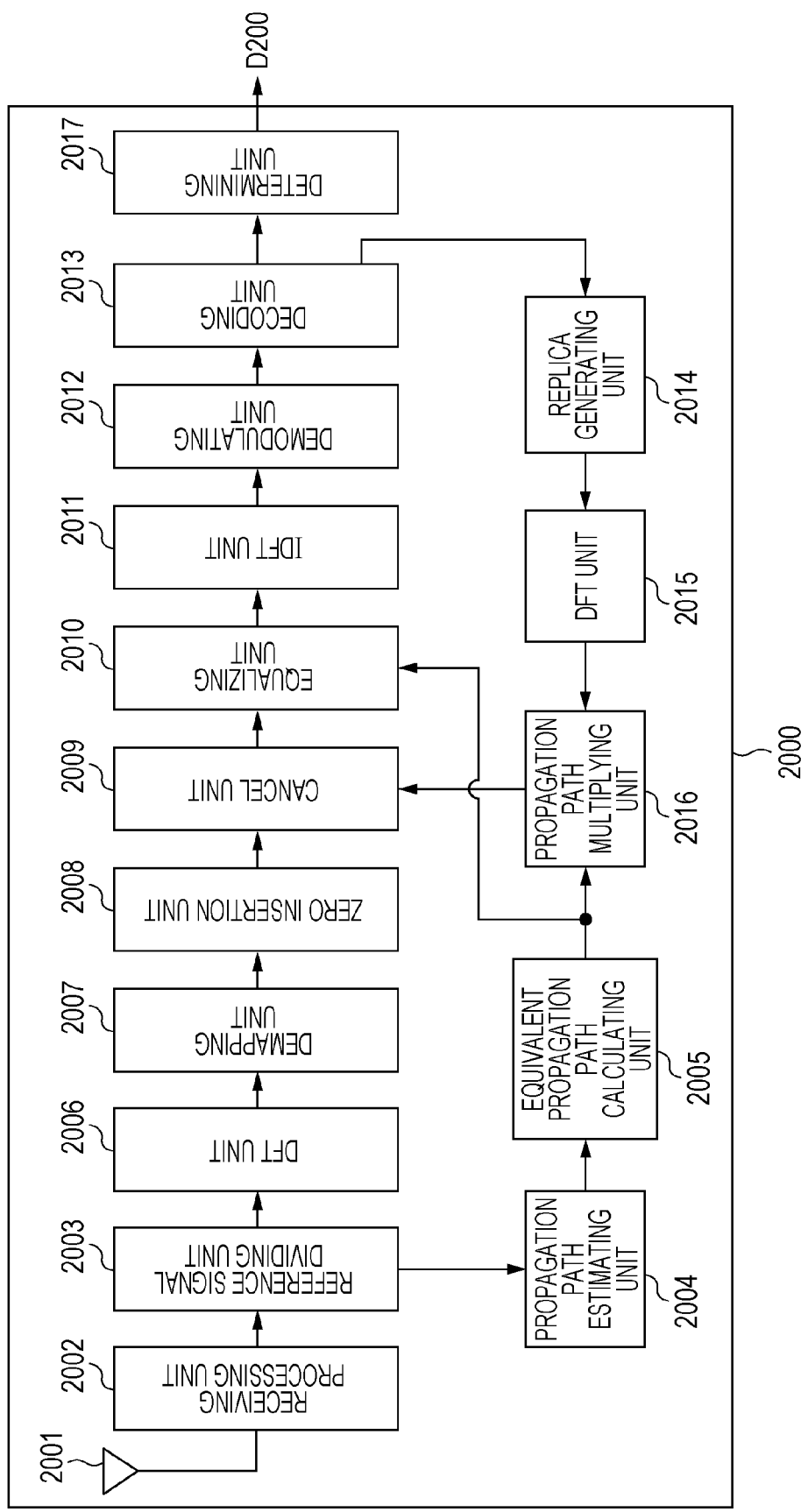
FIG. 21 is a block diagram illustrating an example configuration of a clipped DFT-S-OFDM receiving device according to the related art.

The configuration of a receiving device 900 according to the fourth Embodiment is illustrated in FIG. 19.

A symbol separating unit 907 performs a processing reverse to the processing performed by a modulated symbol multiplexor unit 801 in FIG. 13. That is to say, the input symbol is separated into the systematic symbol and the parity symbol, and these are input into the systematic bit demodulating unit 213 and the parity bit demodulating unit 214, respectively.

The systematic bit demodulating unit 213 demodulates the symbol into the bit, that is to say, performs the bit LLR calculation based on the modulation method performed by the systematic bit modulating unit 102 in FIG. 13. Further, the decomposition to the bit by the systematic bit demodulating unit 213 may use a hard determination value instead of the LLR. The obtained LLR is input into the decoding unit 215. Also, the parity bit demodulating unit 214 performs demodulation of the symbol to the bit based on the modulation method performed by the parity bit modulating unit 103 in FIG. 13, and then the obtained bit LLR is input into the decoding unit 215.

Here, the transmitting power is different at the systematic bit modulating unit 102 and the parity bit modulating unit 103 of the transmitting device 700 (FIG. 13). For this reason, there is a difference in the average value of the LLR output by the systematic bit demodulating unit 213 and the parity bit demodulating unit 214. In the error correction by the decoding unit 215, the LLR for the systematic bit contributes to a transmission property (bit error ratio, block error ratio, throughput property, etc.) more than the LLR for the parity bit. For this reason, the influence of degradation due to the performance of clipping is reduced as compared to a case in which the same modulation method is used.

The LLR for the systematic bit output by the decoding unit 215 is input into the systematic replica generating unit 216.

The LLR for the parity bit output by the decoding unit 215 is input into the parity replica generating unit 217. The systematic replica generating unit 216 and the parity replica generating unit 217 generate the replica of the systematic symbol and the parity symbol, respectively, based on the modulation method used at the systematic bit modulating unit 102 and the parity bit modulating unit 103 in FIG. 13, and then output this to a symbol multiplexor unit 908.

Figure 15:
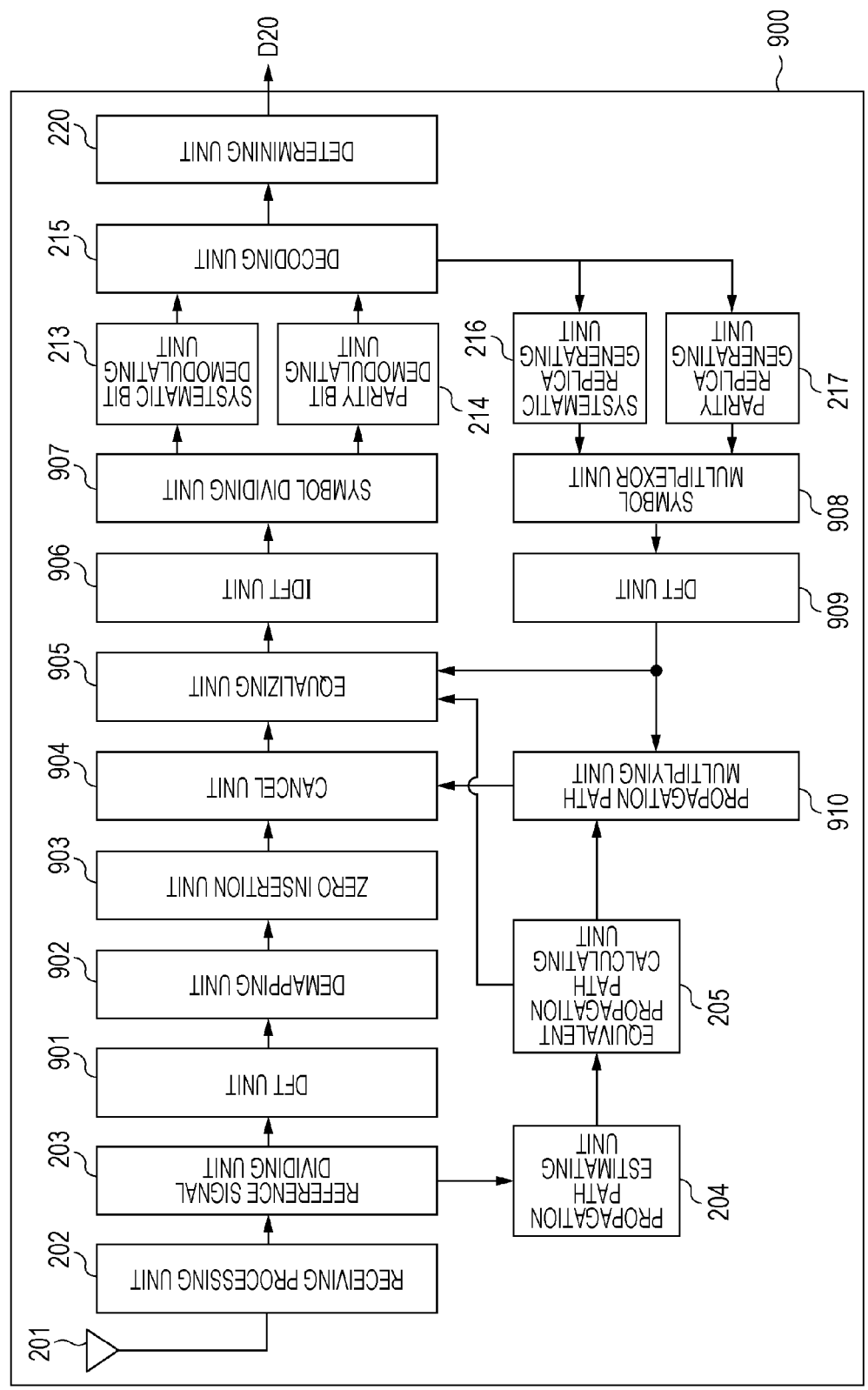
FIG. 15 is a block diagram illustrating an example configuration of a receiving device according to the fourth Embodiment.

The symbol multiplexor unit 908 generates a modulated symbol group by performing a processing similar to that of the modulation symbol multiplexor unit 702 in FIG. 13 on the systematic replica and the parity replica. Blocks for the receiving device 900 in FIG. 15 that have the same reference numerals as that of the receiving device 200 in FIG. 4 are the same as that of the first Embodiment, and so descriptions of these blocks are omitted.

Fifth Embodiment

According to the third and the fourth Embodiments, examples have been described in which transmission has been performed at different average power between the group configured from systematic bits and the group configured from parity bits. According to a fifth Embodiment, a method will be described in which transmission is performed at the same average power for the group configured from the systematic bits and the group configured from the parity bits, and at the same time, and the likelihood of the systematic bit is increased.

Figure 16:
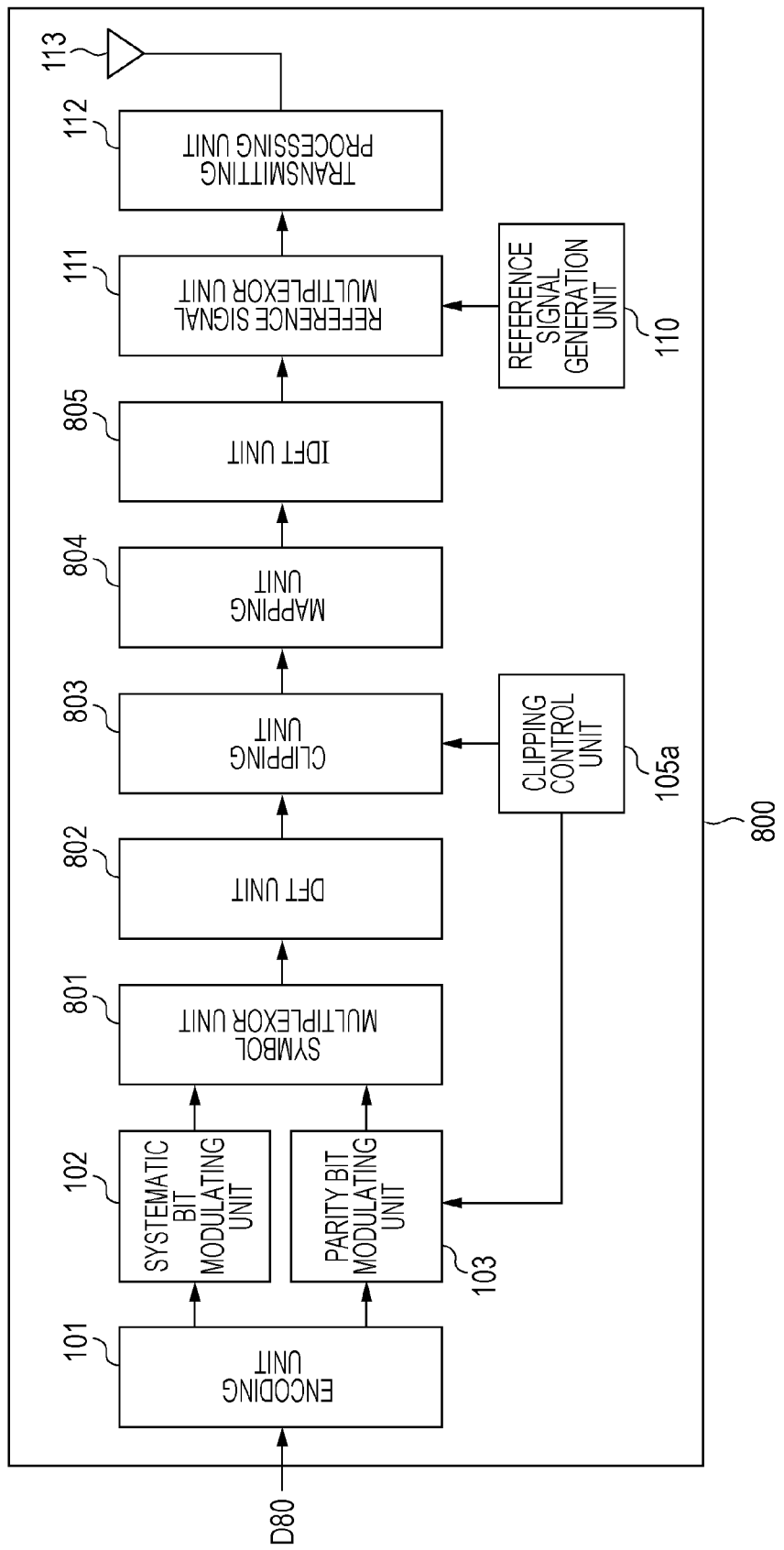
FIG. 16 is a block diagram illustrating an example configuration of a transmitting device according to a fifth Embodiment.

FIG. 16 is a block diagram illustrating an example configuration of a transmitting device 800 according to the fifth Embodiment. A transmission data series D80 of $N_{info}$ bits in input into the encoding unit 101. The encoding unit 101 performs error correction, outputs the systematic bits to the systematic bit modulating unit 102, and outputs the parity bits to a parity bit modulating unit 103b. When the encoding ratio is turbo encoding at one-third, for example, the encoding unit 101 outputs the systematic bits of $N_{info}$ bits to the systematic bit modulating unit 102, and the parity bits of $2N_{info}$ bits to the parity bit modulating unit 103b.

The systematic bit modulating unit 102 performs modulation on the input systematic bits. When the systematic bits of $N_{info}$ bits is input, and BPSK modulation is performed, for example, the systematic bit modulating unit 102 generates a systematic symbol of $N_{info}$ symbols. The obtained systematic symbol of $N_{info}$ symbols is input into the symbol multiplexor unit 801.

Conversely, the parity bit modulating unit 103b performs modulation on the input parity bits. The modulation method at this time is selected after considering the clipping information from a clipping control unit 105b. For example, when the clipping ratio is zero, that is to say, when clipping has not been performed, the same modulation method as that of the systematic bit modulating unit 102 is selected. However, when clipping is performed, a modulation method different from that of the systematic bit modulating unit 102 is selected. For example, when clipping is not performed, as the parity bits of $2N_{info}$ bits are input, and BPSK modulation is performed, a parity symbol of $2N_{info}$ symbols is generated. However, when clipping is performed, as a parity bits of $2N_{info}$ bits are input, and QPSK modulation is performed, a parity symbol of $N_{info}$ symbols is generated. The modulation method is selected depending on the clipping ratio. The obtained parity symbol is input into the symbol multiplexor unit 801.

Figure 17A:
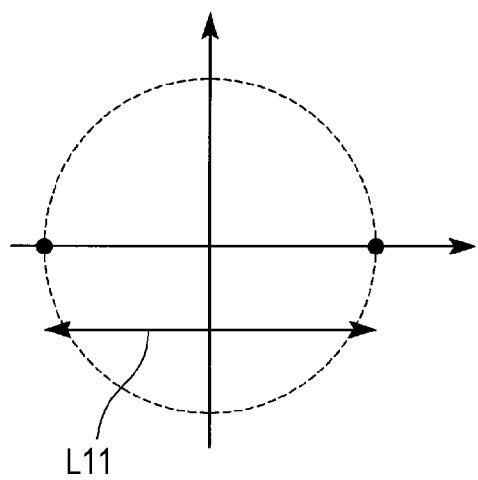
FIG. 17A is a diagram illustrating a signal point arrangement when using BPSK as a modulation method.
Figure 17B:
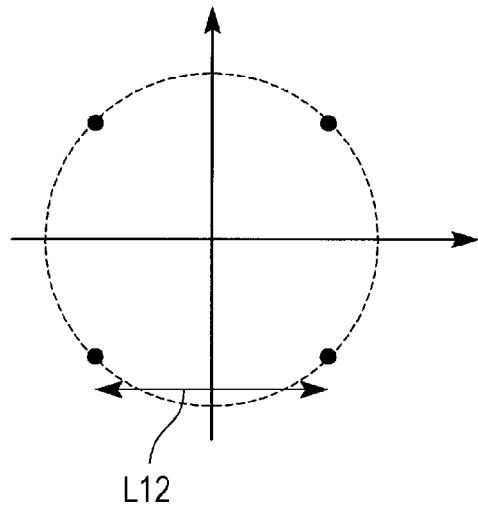
FIG. 17B is a diagram illustrating a signal point arrangement when using QPSK as a modulation method.

In this way, the modulation method for the systematic bit modulating unit 102 and the parity bit modulating unit 103b are modified. FIGS. 17A and 17B are diagrams illustrating the difference in signal point arrangements when using different modulation methods. Specifically, FIG. 17A is a diagram illustrating a signal point arrangement when BPSK is used as the modulation method, and FIG. 17B is a diagram illustrating a signal point arrangement when QPSK is used as the modulation method.

As illustrated in FIGS. 17A and 17B, the low modulation method (BPSK in FIG. 17A) is not able to transmit many bits, and the distance between signal points is wider as compared with the high modulation method (QPSK in FIG. 17B). Further, a distance between signal points L11 when using BPSK as in FIG. 17A is represented as 2d, a distance between signal points L12 when using QPSK as in FIG. 17B is represented as $(\sqrt{2})d$. For this reason, the likelihood (also referred to as the bit likelihood, or LLR) in the receiving device may be increased with the low modulation method, as compared to the high modulation method. Therefore, by using the BPSK at the systematic bit modulating unit 102, while the transmitting power per symbol is maintained at a constant, the likelihood of the systematic bit at the receiving device may be increased.

Figure 18A:
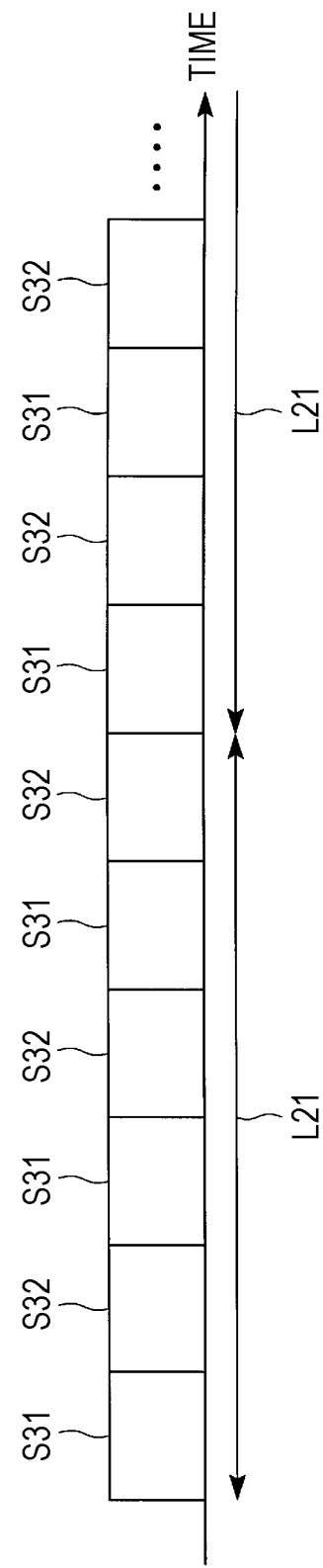
FIG. 18A is a diagram illustrating an example of a sequence of time multiplexing the systematic bit and the parity bit according to a fifth Embodiment.

The output of the systematic bit modulating unit 102 and the parity bit modulating unit 103b are input into the symbol multiplexor unit 801. The symbol multiplexor unit 801 multiplexes the input systematic symbol and the parity symbol, and generates the symbol group. Here, the multiplexing method may multiplex the parity symbol of $N_{info}$ symbols after the systematic symbol of $N_{info}$ symbols, or as illustrated in FIG. 18A, may alternately multiplex one systematic symbol and parity symbol at a time. Specifically, in a DFT zone L21 in FIG. 18A, a systematic symbol S31 and a parity symbol S32 are arranged in the order of systematic symbol S31 and parity symbol S32, systematic symbol S31 and parity symbol S32, systematic symbol S31 and parity symbol S32.

Figure 18B:
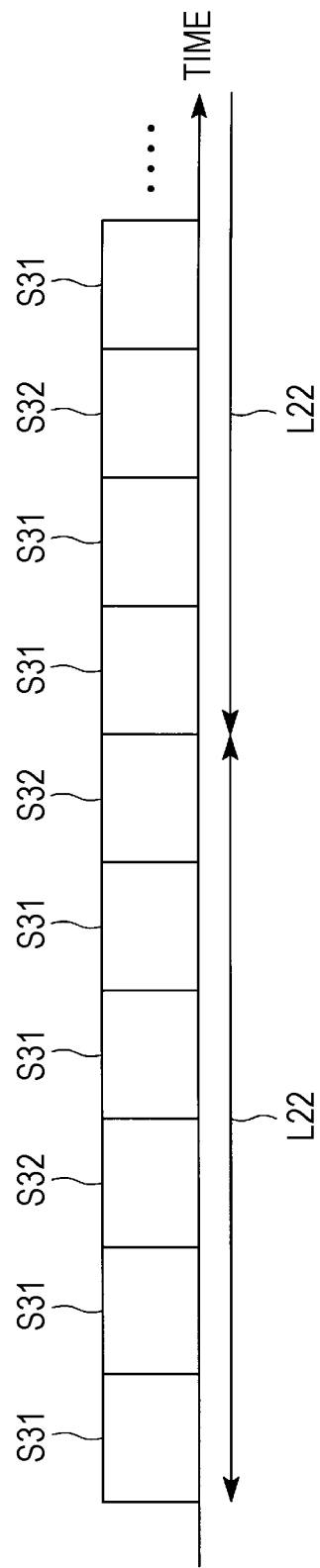
FIG. 18B is a diagram illustrating another example of a sequence of time multiplexing the systematic bit and the parity bit according to the fifth Embodiment.

Also, when the parity bits are punctured, the number of parity bits is small, and so the number of parity symbols naturally decreases. In this case, the systematic symbol and the parity symbol are multiplexed as illustrated in FIG. 18B, for example. Specifically, in a DFT zone L22 in FIG. 18B, the systematic symbol S31 and the parity symbol S32 are arranged in the order of systematic symbol S31, systematic symbol S31, parity symbol S32, systematic symbol S31, systematic symbol S31, parity symbol S32.

The symbol group obtained in this way is input into a DFT unit 802. The transmission processing hereafter is similar to that of the other embodiments, and so their description is omitted.

The signal transmitted from the transmitting device 800 (FIG. 16) is received by the receiving antenna of the receiving device over a wireless propagation path. The configuration of a receiving device 950 according to the fifth Embodiment is illustrated in FIG. 19. Processing from the receiving antenna 201 to an IDFT unit 906 is similar to that of the receiving device 900 according to the fourth Embodiment (FIG. 15), and so their description is omitted.

The symbol separating unit 907 performs a processing reverse to the processing performed by the modulated symbol multiplexor unit 801 in FIG. 16. That is to say, the symbol separating unit 907 separates the input symbol into the systematic symbol and the parity symbol, and inputs these into the systematic bit demodulating unit 213 and the parity bit demodulating unit 214b, respectively.

The systematic bit demodulating unit 213 demodulates the symbol into the bit, that is to say, performs the bit LLR calculation based on the modulation method performed by the systematic bit modulating unit 102 in FIG. 16. Further, the decomposition to the bit by the systematic bit demodulating unit 213 may use a hard determination value instead of the LLR. The obtained bit LLR is input into the decoding unit 215. Also, a parity bit demodulating unit 214b performs a demodulation of the symbol to the bit based on the modulation method performed by the parity bit modulating unit 103b in FIG. 16, and then the obtained bit LLR is output to the decoding unit 215.

Here, the systematic bit modulating unit 102 and the parity bit modulating unit 103b of the transmitting device 800 perform modulation by different modulation methods. For this reason, there is a difference in the average value of the LLR output by the systematic bit demodulating unit 213 and the parity bit demodulating unit 214b. For example, when BPSK is used at the systematic bit modulating unit 102, and QPSK is used at the parity bit modulating unit 103b, the bit LLR output by the systematic bit demodulating unit 213 has a higher reliability than the LLR output by the parity bit demodulating unit 214b. Regarding error correction by the decoding unit 215, the LLR for the systematic bit contributes to a transmission property (bit error ratio, block error ratio, throughput properties, etc.) more than the LLR for the parity bit. For this reason, the influence of degradation due to the performance of clipping is reduced as compared to a case in which the same modulation method is used.

The LLR for the systematic bit output by the decoding unit 215 is input into the systematic replica generating unit 216. The LLR for the parity bit output by the decoding unit 215 is input into the parity replica generating unit 217. The systematic replica generating unit 216 and the parity replica generating unit 217 generate the replica of the systematic symbol and the parity symbol, respectively, based on the modulation method used at the systematic bit modulating unit 102 and the parity bit modulating unit 103b in FIG. 16, and then output this to the symbol multiplexor unit 908.

The symbol multiplexor unit 908 generates a modulated symbol group by performing a processing similar to that of the modulated symbol multiplexor unit 801 in FIG. 16 on the systematic replica and the parity replica. Other blocks for the receiving device 950 (FIG. 19) that have the same reference numerals as that of the receiving device 900 (FIG. 15) are the same as that of the fourth Embodiment, and so descriptions of these blocks are omitted.

According to the fifth Embodiment, by modifying the modulation method as a communication parameter between the group configured from the systematic bits and the groups configured from the parity bits, the likelihood ratio of systematic bits and parity bits in the receiving device may be adjusted.

A program operated by the transmitting device and the receiving device is a program that controls a CPU or similar (program that provides functionality to a computer) so as to achieve the functions described with the first through the fifth Embodiments. Also, the information handled by the transmitting device and the receiving device is temporarily stored in RAM during processing, and stored in various types of ROM or HDDs afterwards, where it may be read, edited, or written by the CPU as desirable. The recording medium for storing the program may be any medium such as semiconductor media (for example, ROM, non-volatile memory card, etc.), optical recoding media (for example, DVD, MO, MD, CD, BD, etc.), or magnetic recording media (for example, magnetic tape, floppy disk, etc.).

Also, the previously described functions may be achieved by a shared processing between not only the executing of the loaded program to achieve the functions described with the first through the fifth Embodiments, but also by an operating system, other application programs, etc., based on the instructions in this program. Also, when being distributed in the market, the program may be distributed stored on a portable recording medium, or transferred to a server computer connected to a network such as the Internet. In this case, the recording device of the server computer is also included in the present invention.

Also, either a portion or all of the transmitting device and receiving device according to the first through fifth Embodiments may be achieved as LSI integrated circuits. Each functional block of the transmitting device and receiving device may be on individual chips, or either a portion or all these may be integrated on a single chip. Also, the method for integrating circuits is not limited to LSI, and may also be achieved by specialized circuits or general processors. Also, when a new technology for integrating circuits to replace LSI results as semiconductor technology advances, integrated circuits from this technology may be used.

The embodiments of this technology have been described in detail with reference to the drawings, but the specific configurations are not limited to these embodiments, and other designs not departing from the spirit of this invention are included in the scope of the patent claims. For example, the first through fifth Embodiments according to the present invention have been described individually, but two or more of these embodiments may be combined.

INDUSTRIAL APPLICABILITY

The present invention is preferably used in wireless base station devices and wireless terminal devices.

REFERENCE SIGNS LIST 1001 encoding unit
1002 modulating unit
1003 DFT unit
1004 clipping control unit
1005 clipping unit
1006 mapping unit
1007 IDFT unit
1008 reference signal generating unit
1009 reference signal multiplexor unit
1010 transmitting processing unit
1011 transmitting antenna
2001 receiving antenna
2002 receiving processing unit
2003 reference signal separating unit
2004 propagation path estimating unit
2005 equivalent propagation path calculating unit
2006 DFT unit
2007 demapping unit
2008 zero insertion unit
2009 cancelling unit
2010 equalization unit
2011 IDFT unit
2012 demodulating unit
2013 decoding unit
2014 replica generating unit
2015 DFT unit
2016 propagation path multiplying unit
2017 determining unit
11 transmitting device of the first Embodiment
12 transmitting device of the second Embodiment
13 receiving device
101 encoding unit
102 systematic bit modulating unit
103 parity bit modulating unit
104-1, 104-2 DFT unit 105 clipping control unit
106 clipping unit
107-1, 107-2 mapping unit
108-1, 108-2 IDFT unit
109 symbol multiplexor unit
110 reference signal generating unit
111 reference signal multiplexor unit
112 transmitting processing unit
113 transmission antenna
201 receiving antenna
202 receiving processing unit
203 reference signal separating unit
204 propagation path estimating unit
205 equivalent propagation path calculating unit
206 symbol separating unit
207-1, 207-2 DFT unit
208-1, 208-2 demapping unit
209 zero insertion unit
210-1, 210-2 cancelling unit
211-1, 211-2 equalization unit
212-1, 212-2 IDFT unit
213 systematic bit demodulating unit
214 parity bit demodulating unit
215 decoding unit
216 systematic replica generating unit
217 parity replica generating unit
218-1, 218-2 DFT unit
219-1, 219-2 propagation path multiplying unit
220 determining unit
301 reference signal generating unit
302 reference signal generating unit
303-1, 303-2 reference signal multiplexor unit
304-1, 304-2 transmitting processing unit
305-1, 305-2 transmitting antenna
401-1, 401-2 receiving antenna
402-1, 402-2 receiving signal processing unit
403-1, 403-2 reference signal separating unit
404-1, 404-2 propagation path estimating unit
405-1, 405-2 DFT unit
406-1, 406-2 demapping unit
407-1, 407-2 cancelling unit
408 MIMO demultiplexling unit
409 zero insertion unit
410-1, 410-2 IDFT unit
411 systematic bit demodulating unit
412 parity bit demodulating unit
413 decoding unit
414 systematic replica generating unit
415 parity replica generating unit
416-1, 416-2 DFT unit
417 clipping unit
418 propagation path multiplying unit
419 determining unit
420 signal separating unit
421 zero insertion unit
422-1, 422-2 signal combining unit
501 transmitting power redistribution unit
105a clipping control unit
601 redistribution amount calculating unit
602-1, 602-2 amplitude multiplying unit
701 transmitting power redistribution unit
702 symbol multiplexor unit
703 DFT unit
704 clipping unit
705 mapping unit
706 IDFT unit
601a redistribution amount calculating unit
602a-1, 602a-2 amplitude multiplying unit
801 symbol multiplexor unit
802 DFT unit
803 clipping unit
804 mapping unit
805 IDFT unit
103b parity bit modulating unit
105b clipping control unit
901 DFT unit
902 demapping unit
903 zero insertion unit
904 cancelling unit
905 equalization unit
906 IDFT unit
907 symbol separating unit
908 symbol multiplexor unit
909 DFT unit
910 propagation path multiplying unit
214b parity bit demodulating unit

The invention claimed is:

1. A wireless transmission device comprising:
a communication parameter setting circuitry configured to group time domain signals into a group of systematic bits and a group of parity bits for error correction encoding and to set different communication parameters for each of the groups;
a DFT circuitry configured to convert each of the groups of the time domain signals into frequency domain signals;
a clipping circuitry configured to perform a clipping processing which deletes a portion of the frequency domain signals:
an IDFT circuitry configured to convert the frequency domain signals after the clipping processing into second time domain signals; and
a transmitting circuitry configured to transmit the second time domain signals after the clipping processing.

2. The wireless transmission device according to claim 1, wherein the communication parameter setting circuitry uses electrical power as the communication parameter.

3. The wireless transmission device according to claim 2, wherein the communication parameter setting circuitry determines the electrical power allocated per group on the basis of a clipping ratio used by the clipping circuitry.

4. The wireless transmission device according to claim 1, wherein the communication parameter setting circuitry uses a clipping ratio as the communication parameter.

5. The wireless transmission device according to claim 1, wherein the communication parameter setting circuitry uses at least one of either a modulation method or encoding ratio as the communication parameter.

6. The wireless transmission device according to claim 1, wherein the transmitting circuitry transmits the second time domain signal after the clipping processing from different antennas per group grouped by the communication parameter setting circuitry.

7. A wireless transmission method, comprising:
grouping of time domain signals into a group of systematic bits and a group of parity bits for error correction encoding and setting of a different communication parameter for each of the groups;
converting each of the groups of the time domain signals into frequency domain signals;
performing clipping processing which deletes a portion of spectra of the frequency domain signals;
converting the frequency domain signals after the clipping processing into second time domain signals;
and transmitting the second time domain signal.

* * * * *